(12) United States Patent
Uehara

(10) Patent No.: US 7,199,927 B2
(45) Date of Patent: Apr. 3, 2007

(54) OPTICAL ELEMENT AND OPTICAL ADD-DROP MODULE

(75) Inventor: Noboru Uehara, Komaki (JP)

(73) Assignee: Santec Corporation, Komaki (JP)

( * ) Notice: Subject to any disclaimer, the term of this patent is extended or adjusted under 35 U.S.C. 154(b) by 280 days.

(21) Appl. No.: 10/864,894

(22) Filed: Jun. 10, 2004

(65) Prior Publication Data

US 2005/0018301 A1    Jan. 27, 2005

(30) Foreign Application Priority Data

Jun. 10, 2003    (JP)    ............................. 2003-165377

(51) Int. Cl.
    *G02B 27/00*    (2006.01)
(52) U.S. Cl. ...................... 359/579; 359/585; 359/586; 359/589; 359/260
(58) Field of Classification Search ...................... None
    See application file for complete search history.

(56) References Cited

U.S. PATENT DOCUMENTS

| | | | | |
|---|---|---|---|---|
| 3,308,394 | A | * | 3/1967 | Snitzer et al. ................. 372/92 |
| 3,546,620 | A | * | 12/1970 | Kessler et al. ................. 372/14 |
| 4,240,696 | A | | 12/1980 | Tracy et al. ................. 359/578 |
| 5,027,178 | A | | 6/1991 | Svilans ......................... 257/14 |
| 5,068,749 | A | | 11/1991 | Patel |
| 5,731,889 | A | * | 3/1998 | Jeong et al. ................. 359/258 |
| 6,317,251 | B1 | * | 11/2001 | Wang ........................... 359/318 |
| 6,522,469 | B1 | | 2/2003 | Fuqua et al. |
| 2002/0009251 | A1 | | 1/2002 | Byrne ............................. 385/2 |
| 2002/0191268 | A1 | | 12/2002 | Seeser et al. |
| 2003/0020926 | A1 | | 1/2003 | Miron .......................... 356/519 |
| 2003/0081319 | A1 | | 5/2003 | Hsu .............................. 359/579 |
| 2003/0087121 | A1 | | 5/2003 | Domash et al. |
| 2005/0013000 | A1 | * | 1/2005 | Uehara ......................... 359/586 |
| 2006/0228089 | A1 | * | 10/2006 | Shimokozono et al. ..... 385/147 |

FOREIGN PATENT DOCUMENTS

| | | |
|---|---|---|
| JP | 61-88229 A | 5/1986 |
| JP | 61-268071 A | 11/1986 |
| JP | 8-227014 A | 9/1996 |
| JP | 11-119186 A | 4/1999 |
| JP | 2001-21852 A | 1/2001 |
| JP | 2001-91911 A | 4/2001 |
| JP | 2001-324702 A | 11/2001 |

* cited by examiner

*Primary Examiner*—Arnel Lavarias
(74) *Attorney, Agent, or Firm*—Smith Patent Office

(57) ABSTRACT

In an optical element, a first mirror stack layer is formed on a substrate, and a spacer layer made of a paraelectric material having a secondary electrooptic effect is formed thereon through a first conductive thin film. Further, a second mirror stack layer is formed thereon through a second conductive thin film, and a coupling layer is formed thereon; thus, a basic structure of the optical element is formed. By changing a voltage to be applied between the first and second conductive thin films, it becomes possible to switch wavelengths of light to be transmitted through the optical element at a high speed.

31 Claims, 18 Drawing Sheets

F I G. 1 4
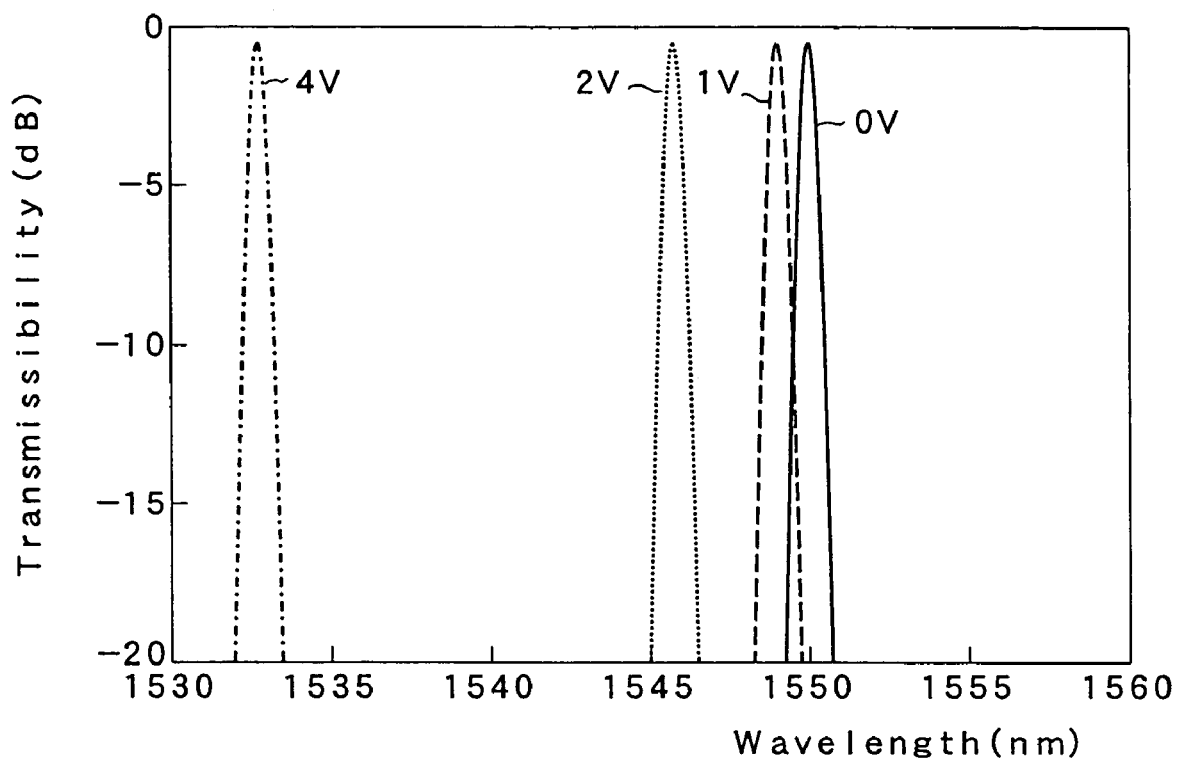

F I G. 1 5
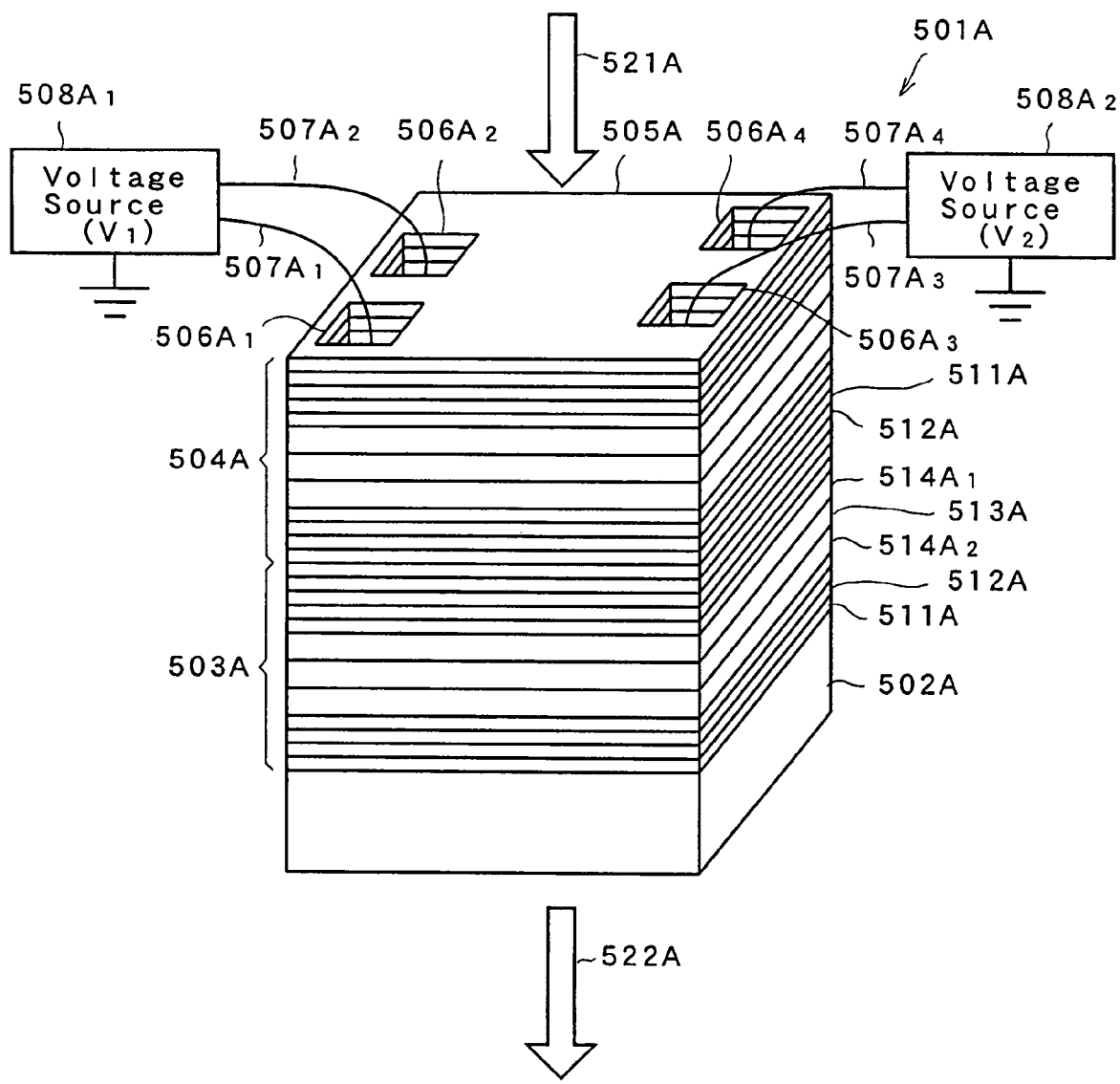

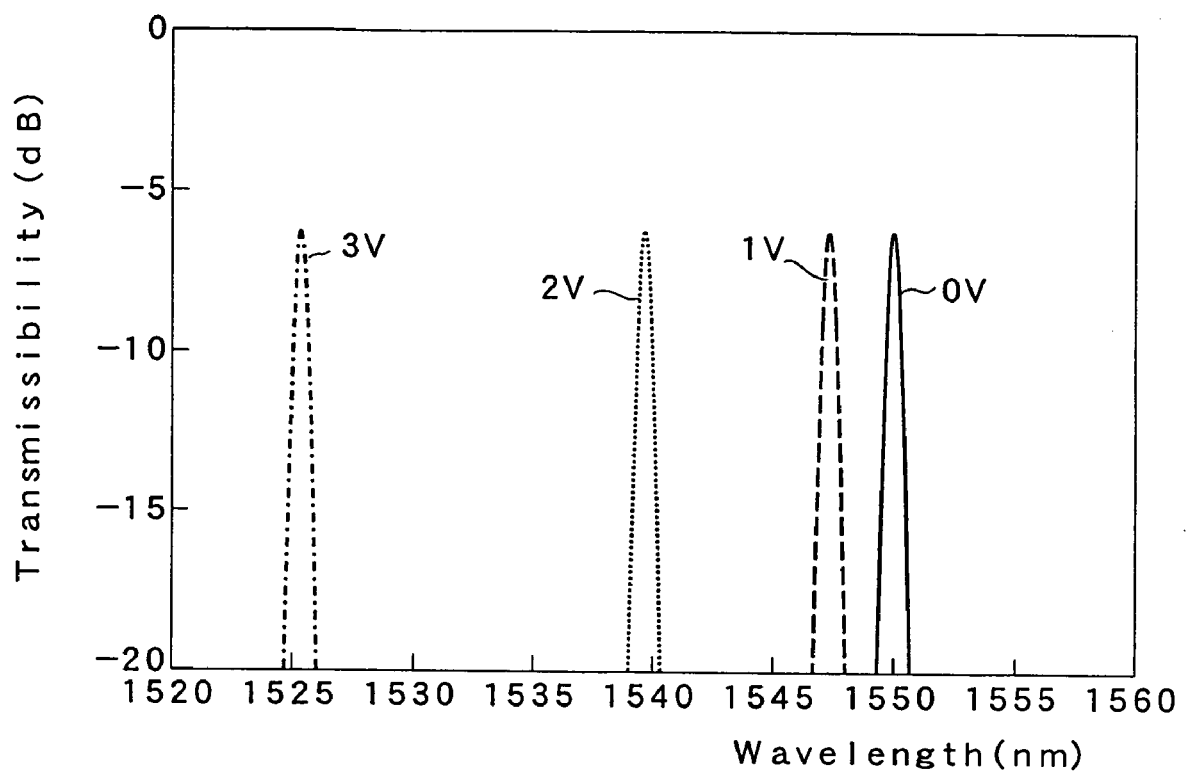
F I G. 16

F I G. 1 7
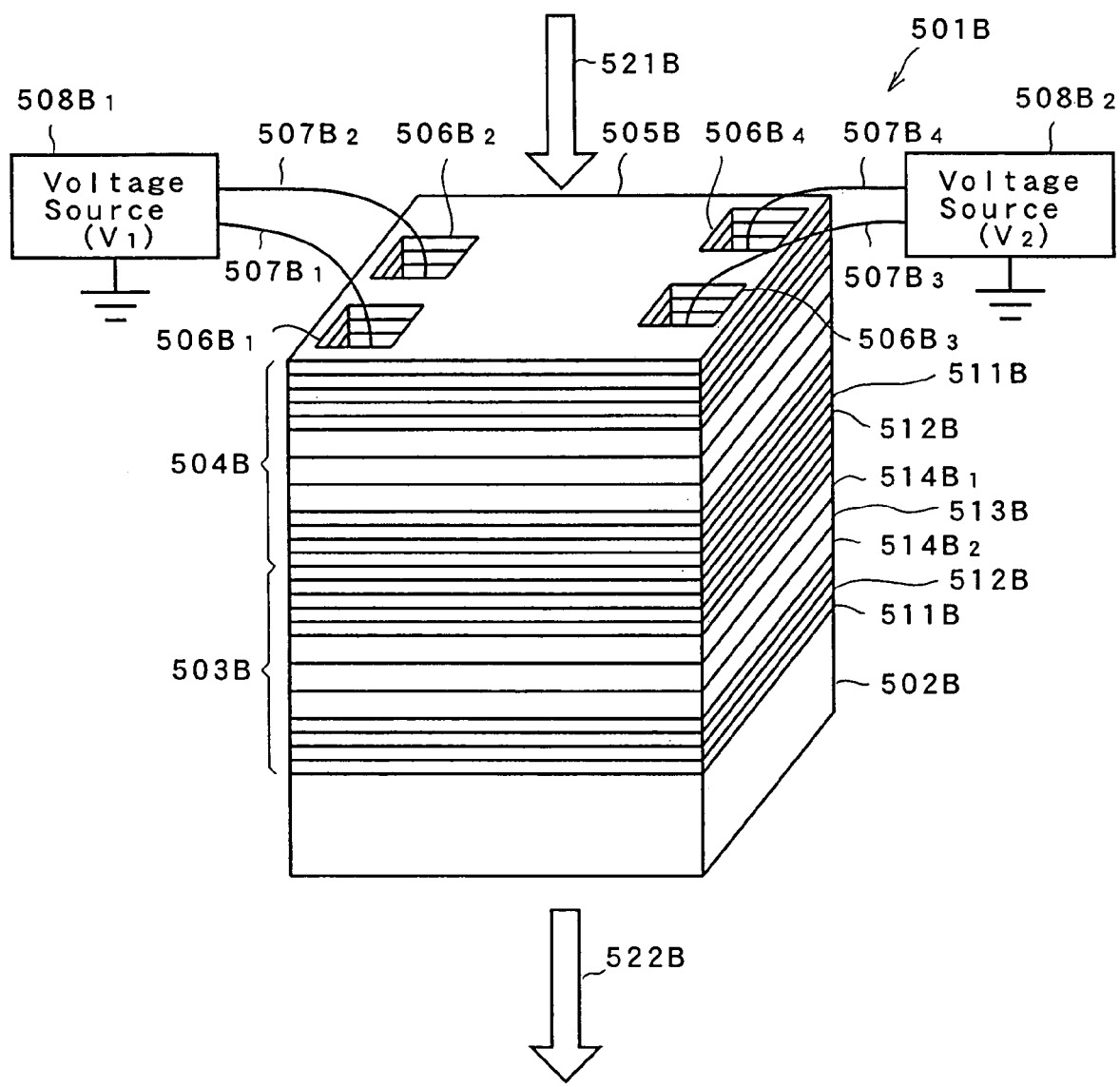

OPTICAL ELEMENT AND OPTICAL ADD-DROP MODULE

BACKGROUND OF THE INVENTION

1. Field of the Invention

The present invention relates to an optical element and an optical add-drop module using such a filter, and more particularly, to an optical element capable of selectively transmitting or reflecting light having a specific wavelength while optionally changing the wavelength itself, and an optical add-drop module which has modularized these devices.

2. Discussion of the Related Art

Optical bandpass filters have been used for selecting light with a specific wavelength from inputted light rays. Among the bandpass filers, a tunable optical filter capable of changing a wavelength to be selected is applied various cases. For example, the tunable filter is used as a component of a multi-channel analyzer so as to change the wavelength to measure properties of a substance. The typical application has been proposed in JP-A 08-227014 (1996). This tunable optical filter has realized tunable characteristic by changing the physical film thickness.

FIG. 1 shows a tunable optical filter in accordance with a first prior art. This tunable optical filter 101 has a structure in that a dielectric multilayer film filter 102 is attached onto a movable stage 103, and maintained thereon in a manner to freely shift in the direction of arrow X. The dielectric multilayer film filter 102 is constituted by dielectric multilayer films 109 formed by alternately stacking a number of first and second dielectric films 107 and 108 having mutually different refractive indexes with continuously varied thicknesses on one surface of a transparent substrate 106. The filter 102 is attached with its length direction being set in the direction of arrow X. Here, FIG. 1 indicates these stacked layers in a schematic manner. The central wavelength of the filter 102 is proportional to the optical film thickness nL. Here, the value n denotes the effective refractive index of a medium which constitutes the filter and the value L denotes its film thickness. By forming the dielectric multilayer film filter 102 having bandpass filter characteristics, with the film thickness having a gradient along a one-dimensional direction (the direction of arrow X), it is possible that in the place where the film is thin, a transmission peak is set at a short wavelength, and that in the place where the film is thick, the transmission peak is set at a long wavelength.

Upon using this tunable optical filter 101, a photodiode (PD) 111 is secured at a fixed position so that incident light 112 is made incident on the photodiode 111 through the dielectric multilayer film filter 102. In this layout, when the filter 102 is shifted in the direction of arrow X, the peak transmission wavelength is changed in response to the shift in the direction of arrow X, so that the wavelength of receiving light of the photodiode 111 changes continuously.

FIG. 2 shows the relationship between the selected wavelength when the tunable optical filter of is shifted in the direction of arrow X in FIG. 1 and transmissibility of the light. As shown in FIG. 2, when the tunable optical filter is, for example, shifted by the movable stage 103 from a first position $X_1$ to a second position $X_2$ in the direction of arrow X, the transmitting wavelength of light changes continuously from a first wavelength $\lambda_1$ to a second wavelength $\lambda_2$ in accordance with the shift. In FIG. 2, for example, two wavelengths are shown between the first position $X_1$ and the second position $X_2$.

In conventional tunable filters, only the bandpass filter referred to as a single cavity type has been put into practical use. This is because, as the number of cavities increases to double, triple and so on, the film thickness control of each layer which constitutes the multilayer film filter becomes difficult. In general, in the tunable filter device used in the optical communication technique, those filter devices having a substrate dimension of about 50×4 mm are used. In the first conventional example, it is difficult to form a dielectric multilayer filter having 100 or more layers over the entire surface of a large substrate with a film thickness gradient ranging over 50 mm in a one-dimensional direction, with each of desired film-thickness distributions. Moreover, it is difficult to produce the filters with high yield, causing very high costs. In order to realize a tunable bandpass filter having a narrow band of 1 nm or less in the transmission band width in the optical communication field, it is required that films should be formed with a desired film thickness of each layer in an error level of 0.01% or less. The range of the conforming article which satisfies this accuracy is generally almost only the 3 to 10 mm range, due to film thickness distribution variations upon film formation in a film forming device, aging variations of the film formation condition and the like. Therefore, tunable bandpass filters obtained through another different technique have been desired.

The optical communication system obtained by the wavelength division multiplexing (WDM) system has been noticed as the next generation large-capacity optical communication system. In the optical communication system of the WDM system, optical signals ($\lambda_1, \lambda_2, \ldots, \lambda_n$) which have respectively different wavelengths are allowed to propagate through one optical fiber. Therefore, each of nodes needs to have the ability of carrying out a process for adding (inserting) or dropping (picking out) optical signals with a single or a plurality of wavelengths on demand. An optical add-drop module (OADM) is used to meet the demand. The OADM is an optical separation/coupling device that is inserted into a network of the optical communication, and extracts information from the high-speed communication path and introduces information into the communication path.

In the conventional OADM, the wavelength to be added or dropped is fixed to a single wavelength. In other words, only the optical signal of specific one wavelength corresponding to a specific signal channel is extracted (dropped) from a multi-wavelength signal component that propagates through a single optical fiber, and an optical signal having the same wavelength is introduced (added) thereto. Moreover, in order to allow further flexible signal processing, an OADM that can dynamically select an optional signal channel, and add or drop an optical signal of the corresponding wavelength is required. In such a module, not a bandpass filter for allowing only one of the wavelengths to pass, but a bandpass filter with tunable characteristic is required.

In the tunable optical filter 101 shown in FIG. 1, the selection of wavelength is carried out by mechanically shifting the movable stage 103. Therefore, even in an attempt to apply the tunable optical filter 101 to this OADM, there is a limitation in the response speed upon changing the wavelength to be added or dropped. For this reason, although it is possible to meet a limited request such as a request for assigning a specific communication path to a specific customer during a predetermined time zone, it is impossible to dynamically select a wavelength to be added or dropped at a high speed.

Researches for tunable optical filters with higher response speed have been made. JP-A 11-119186 (1999) has proposed a tunable optical filter in which a wavelength to be selected is made variable by changing the refractive index of liquid crystal under control of an applied voltage. FIG. 3 shows a structure of the tunable optical filter in accordance with a second prior art. The tunable optical filter 121 is provided with a first layer 122, a second layer 123 that is placed on the light-incident side with respect to the first layer 122, and a third layer 124 that is placed on the light emission side with respect to the first layer 122. Optical mirrors (dielectric mirror) films 125A and 125B are placed on the second and third layers 123 and 124 on the sides closer to the first layer 122. Moreover, the other layers except for these layers on the second and third layers 123 and 124 constitute transparent electrodes 126A and 126B. Transparent substrates 127A and 127B are formed on the outside of the second and third layers 123 and 124, and anti-reflection coat films 128A and 128B are formed on the outside of these layers.

The first layer 122 of the tunable optical filter 121 is made of a material the refractive index of which changes in response to an electric field. This material is formed by dispersing liquid crystal droplets having a diameter of not more than 150 nm in a light-transmitting medium such as polymer (high molecules) and quartz glass. The second layer 123 is transparent within a wavelength band to be used, and has no polarization dependency with respect to changes in the refractive index with or without the application of a voltage. For this reason, no polarization dependency occurs in the characteristic of the tunable optical filter 121. With respect to the matrix medium in which liquid crystal droplets are dispersed, polymers having a superior light-transmitting property without any optical anisotropy are used; and examples thereof include PMMA-based polymers, polystyrene-based polymers, polycarbonate-based polymers, thermo-setting or photo-curing acryl-based polymers, epoxy-based polymers, polyurethane-based polymers, polyisocyanate-based polymers, polyene polythiol-based polymers, glass and the like.

The tunable optical filter 121 is a Fabry-Perot etalon-type tunable filter that uses a polymer as the matrix medium with a micro-liquid crystal droplet dispersion polymer being sandwiched between cavities thereof. In the case where no voltage is applied to the transparent electrodes 126A and 126B, the liquid crystal molecules in the liquid crystal droplet in the first layer 122 are arranged in random directions. Therefore, the refractive index that is exerted on light made incident on the micro-liquid crystal droplet dispersion polymer layer corresponds to an averaged refractive index of refractive indexes ($n_e$, $n_o$) of nematic liquid crystal. When a voltage is applied by using an AC power supply (not shown), the liquid crystal molecules are aligned in the direction of the applied electric field, and the refractive index approaches $n_o$. In response to such a change in the refractive index, the transmission spectrum to incident light 131 made incident on the tunable optical filter 121 is changed, with the result that the wavelength of the transmission light 132 is changed.

Here, the tunable optical filter 121 shown in FIG. 3 requires a high voltage of not less than 100 volts as an applied voltage. Moreover, many transmission peaks of a wavelength occur cyclically with respect to the wavelength axis. Consequently, in order to shield transmission peaks occurring outside the originally required wavelength band, another filter is further required. Moreover, the filter properties are more susceptible to environmental influences such as humidity and temperature. For this reason, it becomes difficult to obtain superior properties with respect to incident light with a high output.

Moreover, in the tunable optical filter 121 shown in FIG. 3, the driving operation for liquid crystal needs to be carried out by an AC current, and is not carried out by a DC current. An attempt to carry out a DC driving operation would cause a dielectric breakdown. The resulting problem is that, although the tunable optical filter 121 is allowed to change the wavelength, it fails to maintain the wavelength in a fixed state within a desired filter wavelength.

The foregoing description has discussed conventional problems with tunable optical filters, and with respect to optical elements other than tunable optical filers that selectively absorb and reflect a specific wavelength component also, conventionally, the same problems have been raised. Moreover, with respect to optical add-drop modules which add and drop optical signals by using tunable optical filters also, conventionally, the same problems have been raised.

SUMMARY OF THE INVENTION

In order to solve the above-mentioned problems, one of the objectives of the present invention is to provide an optical element and an optical add-drop module, which can change wavelength selection characteristics at high speed.

The optical element of the present invention has a structure in that at least one cavity is formed on a substrate. The cavity has first and second composite stack layers and a spacer layer. The first composite stack layer includes a first mirror stack layer constituted by alternately stacking a plurality of first and second dielectric thin films having respectively different refractive indexes and a first conductive film formed on the first mirror stack layer. The second composite stack layer includes a second mirror stack layer constituted by alternately stacking a plurality of first and second dielectric thin films having respectively different refractive indexes and a second conductive film formed on the second mirror stack layer. The spacer layer, which is made of a planar paraelectric material with the secondary electrooptic effect, has one of the faces made in contact with the first conductive film and the other face made in contact with the second conductive film.

In the present invention, the first composite stack layer and the second composite stack layer having the same structure are placed in a manner so as to sandwich the spacer layer so that an optical element, such as a tunable optical filter, which is made of a paraelectric material having a secondary electrooptic effect and has a Fabry-Perot resonator structure as its basic structure, is formed. Further, by changing a voltage to be applied between the first and second conductive films, spectrum characteristics of light rays that are made incident on the first composite stack layer or the second composite stack layer and transmitted through or reflected from the layer are controlled.

In the present invention, since the spacer layer is made of a paraelectric material having the secondary electrooptic effect, hardly any hysteresis effects are generated. The hysteresis effects are generated by the primary electrooptic effect. With this arrangement, it becomes possible to set the center wavelength of the optical element, such as a tunable optical filter, with high precision, in response to an applied voltage, and also to control the center wavelength thereof.

Here, the first and second mirror stack layers may be formed by alternately stacking the first dielectric thin film made of a high refractive index material having a physical film thickness of a ¼-wavelength of a design wavelength and the second dielectric thin film made of a low refractive index material having a physical film thickness of the ¼-wavelength with a refractive index lower than that of the high refractive-index material. The spacer layer may be placed between these first and second mirror stack layers, and formed as a paraelectric thin film that has a film thickness of positive even-number times the physical film thickness of the ¼-wavelength, and has a secondary electrooptic effect. The first and second dielectric films may be respectively placed between the first mirror stack layer and the spacer layer as well as between the second mirror stack layer and the spacer layer, and formed as transparent conductive thin films each of which has a film thickness of positive odd-number times the physical film thickness of the ¼-wavelength. Moreover, at each of the cavities, a characteristic controlling unit may be added to form an optical element for altering a voltage to be applied between the first and second conductive films. The characteristic control unit controls spectrum characteristics of light rays that are made incident on the first composite stack layer or the second composite stack layer and transmitted through or reflected from the layer.

As described above, in accordance with the present invention, by altering the film design, it is possible to realize an optical element having an optional passband width and a signal-eliminating characteristic for signals with the other wavelengths. Moreover, since the wavelength is changed by controlling the refractive index, it is possible to improve reliability without the necessity of installing any mechanical driving units. The optical element is also excellent in environment resistance. Moreover, by designing films, the optical element of the present invention makes it possible to achieve tunable optical filters having an optional passband width and a signal-eliminating characteristic for signals with other wavelengths, that is, various filters such as a lowpass filter, highpass filter, bandpass filter and notch filter. The present invention simply requires electrode terminals and circuit components to be used for controlling an applied voltage so that it is possible to form a tunable optical filter at low cost.

Furthermore, by altering the film designing using the optical element, it is possible to realize an optical add-drop module having an optional passband width and a signal-eliminating characteristic for signals with the other wavelengths. Since the wavelength is changed through refractive-index control, no mechanical driving parts are required, making it possible to improve the reliability. The present invention simply requires electrode terminals and circuit components for controlling an applied voltage, so that it is possible to form a tunable add-drop module at low cost.

BRIEF DESCRIPTION OF THE DRAWINGS

FIG. 14 is a performance mapping which shows a tunable characteristic of a tunable band pass filter in accordance with the fourth embodiment of the present invention;

FIG. 15 is a perspective view that shows an appearance of a double cavity-type tunable bandpass filter in accordance with a fifth embodiment of the present invention;

FIG. 16 is a performance mapping which shows a tunable characteristic of a tunable bandpass filter in accordance with a fifth embodiment of the present invention;

FIG. 17 is a perspective view that shows an appearance of a double cavity-type tunable bandpass filter in accordance with a sixth embodiment of the present invention;

DESCRIPTION OF THE PREFERRED EMBODIMENTS

Figure 1:
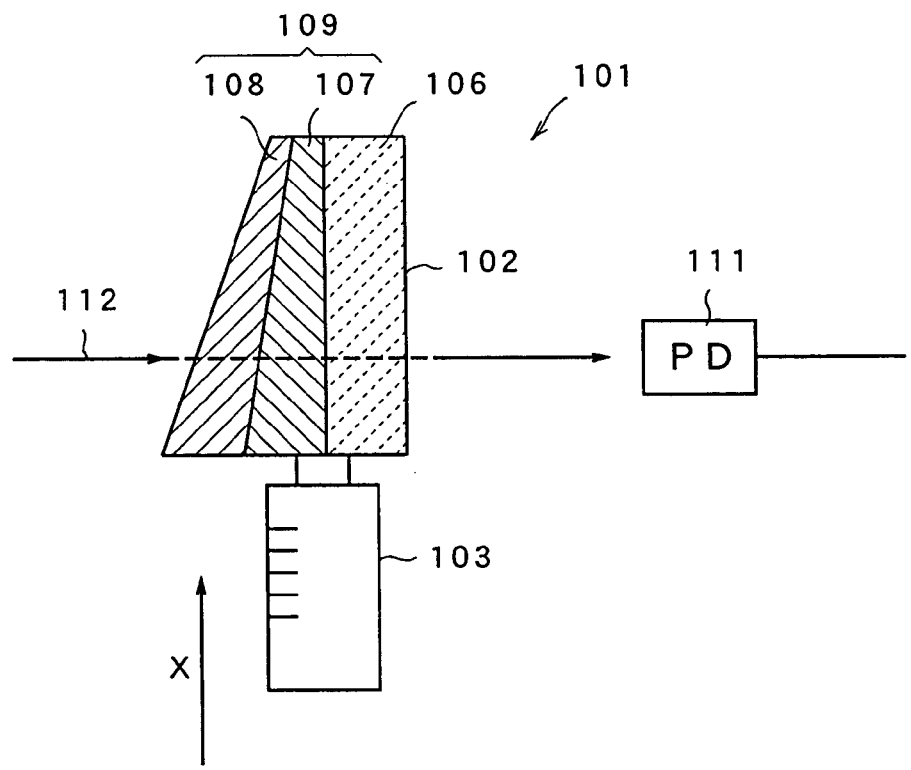
FIG. 1 is a partial cross-sectional view that schematically shows a structure of a tunable optical filter in accordance with a first prior art.
Figure 2:
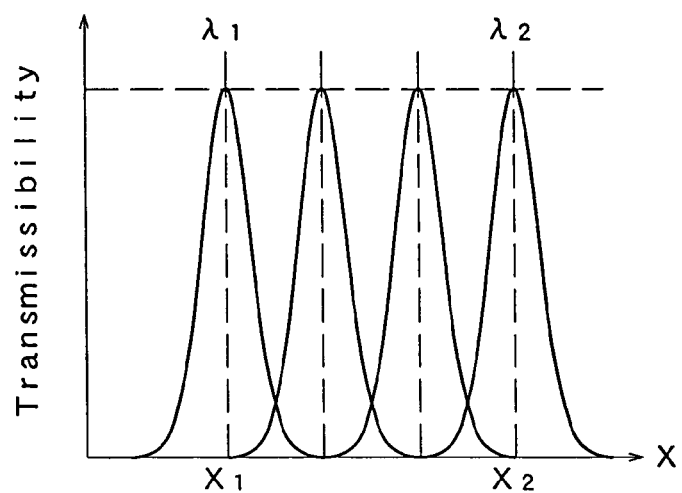
FIG. 2 shows a wavelength characteristic of a tunable optical filter of the first prior art.
Figure 3:
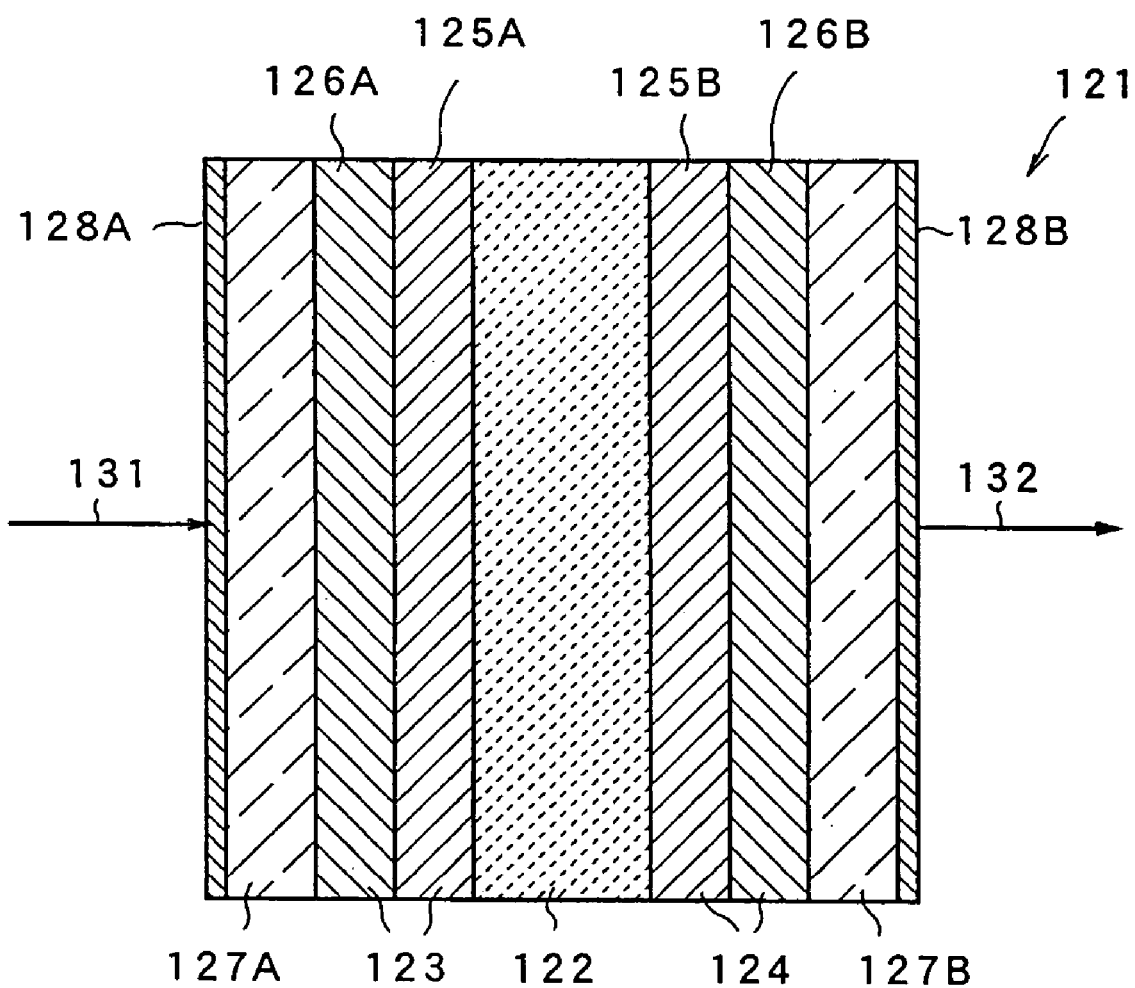
FIG. 3 is a main-portion cross-sectional view that shows a tunable optical filter in accordance with a second prior art.

First, the technology, which forms the presupposition of this invention, will be explained by exemplifying a tunable filter in the optical element. A dielectric multilayer film filter can realize characteristics of various filters such as a lowpass filter, highpass filter, bandpass filter and notch filter, through film designing. In these days, it is also used as the filter for the optical communication, and its high reliability with respect to the environmental resistance and the like has been proved.

The conventional dielectric multilayer film filter is a passive element, and the refractive index and attenuation coefficient of the film are less susceptible to a big change to extrinsic factors such as the temperature, humidity, light irradiation and voltage application, so that it is very stable. It is proposed to control the optical film thickness of each of the thin films that constitute a dielectric multilayer film filter by using any of these extrinsic factors.

Therefore, this invention attempts to utilize the electrooptic effect among them. The electrooptic effect is an effect which changes the refractive index in response to the externally applied voltage. The effect in which the refractive index is linearly changed in response to the applied voltage is referred to as the primary electrooptic effect or the Pocketls effect, and this effect appears in ferroelectrics. The following equation (1) holds between the change quantity $\Delta n_{ij}$ in the refractive index due to the primary electrooptic effect and the applied voltage.

$$\Delta n_{ij} = -(1/2) n_M^3 r_{ij} (V/d) \qquad (1)$$

Here, $n_M$ is the refractive index of the medium which has an electrooptic effect, and $r_{ij}$ is the primary electrooptic coefficient. V and d respectively represent the applied voltage and the thickness of the medium between electrodes.

The refractive index change that is proportional to the square of the applied voltage is referred to as the secondary electrooptic effect or the Kerr effect and this effect is exerted in paraelectric materials. The following equation (2) holds between the change quantity $\Delta n_{ij}$ in the refractive index due to the secondary electrooptic effect and the applied voltage.

$$\Delta n_{ij} = -(1/2) n_M^3 R_{ij} (V/d)^2 \qquad (2)$$

Here, $R_{ij}$ is the secondary electrooptic coefficient. In the case where a dielectric multilayer film filter is formed by using layers having electrooptic effects, since the refractive index is changed by any of the effects, the optical film thickness is allowed to change in proportion to the refractive index, so that the central wavelength of the bandpass filter can be changed.

In case of a paraelectric material, since the material is an isotropic medium, the following equations (3) hold from the symmetric property.

$$R_{11}=R_{22}=R_{33},\ R_{12}=R_{13}=R_{23}=R_{31}=R_{32},\ R_{44}=R_{55}=R_{66} \qquad (3)$$

Incidentally, the other coefficients become zero.

With respect to the thin film that has the electrooptic effect suitable for optical communication, it is desirable to satisfy the following conditions:

(a) To have a great electrooptic coefficient;

(b) To have superior environmental resistance against the temperature, the humidity and the like;

(c) To be less susceptible to losses in the thin film itself;

(d) To achieve a stable operation for a long time;

(e) To provide reproducible film-forming processes in a stable manner; and (f) Not to require a large amount of rare metal materials.

To utilize materials with the secondary electrooptic effect satisfies the above-mentioned conditions.

First, the basic structure of the dielectric multilayer film filter will be described. It supposes that in the optical filter, two kinds of different dielectric materials are used and that the refractive indexes thereof are indicated by $n_H$ and $n_L$ respectively. Moreover, the greater refractive index is defined as the refractive index $n_H$, and the corresponding dielectric material (film) is referred to as high-refractive index dielectric thin film H in the present specification. The smaller refractive index is defined as the refractive index $n_L$, and the corresponding dielectric material (film) is referred to as low-refractive index dielectric thin film L in the present specification.

Upon film-designing the optical filter, the film structure which realizes a dielectric multilayer film mirror having high reflectivity centered on a specific design wavelength $\lambda_0$ is represented by the following expression structure (4):

$$\text{Substrate/H L H L} \ldots \text{H L/Medium} \qquad (4).$$

Here, each of the film thicknesses $d_H$ and $d_L$ of the high-refractive index dielectric film H and the low-refractive index dielectric film L is a physical film thicknesses of a ¼-wavelength, and between the specific design wavelength $\lambda_0$ and the refractive indexes $n_H$, $n_L$, the following equations (5) and (6) hold:

$$d_H = \lambda_0 / 4 n_H \qquad (5)$$

$$d_L = \lambda_0 / 4 n_L \qquad (6).$$

Generally, the medium is either of air, a resin solvent, a solid substrate and the like.

Expression structure (4) indicates a structure in that two kinds of dielectric thin films made of the high-refractive index dielectric thin film H and the low-refractive index dielectric thin film L are alternately laminated on a substrate. Therefore, this expression structure (4) can be simply represented by the following expression structure (7):

$$\text{Substrate/(H L)}^N/\text{Medium} \qquad (7).$$

Expression structure (7) indicates a structure in that a pair of layers of the dielectric film H and the dielectric film L are stacked N times repeatedly. For example, the following expression structure (8) is equivalent to expression structure (9).

$$\text{Substrate/H L H L H L/Medium} \qquad (8)$$

$$\text{Substrate/(H L)}^3/\text{Medium} \qquad (9)$$

When only a specific light wavelength component is separated and extracted, a bandpass filter is used in most cases. The general structure of the resonator of the bandpass filter constituted by the dielectric multilayer film is represented by the following expression structure (10):

$$A = [(HL)^N H \ sL \ H(LH)^N L] \qquad (10).$$

Here, symbol N indicates an integer (0, 1, 2, 3, . . . ). Also, symbol s represents a positive even number (2, 4, 6, 8, . . . ). "(HL)$^N$ H" and "H (LH)$^N$" respectively represent layers referred to as a first mirror stack layer or a second mirror stack layer. "sL" represents a spacer layer. Here, L on the last part represents a coupling layer.

This expression structure (10) indicates a single basic cavity structure of the optical element. In the case of an m-multiplex cavity structure, m-sets of this expression structure (10) are successively laminated on a surface on the upper side of a substrate through coupling layers. By using such an m-multiplex cavity structure having a plurality of laminated layers as the basic cavity structure, it is possible to provide a sharp filter property, for example, as a bandpass filter. The coupling layer, made of a low-refractive index material, is placed between layers in the basic cavity structure.

First Embodiment

Figure 4:
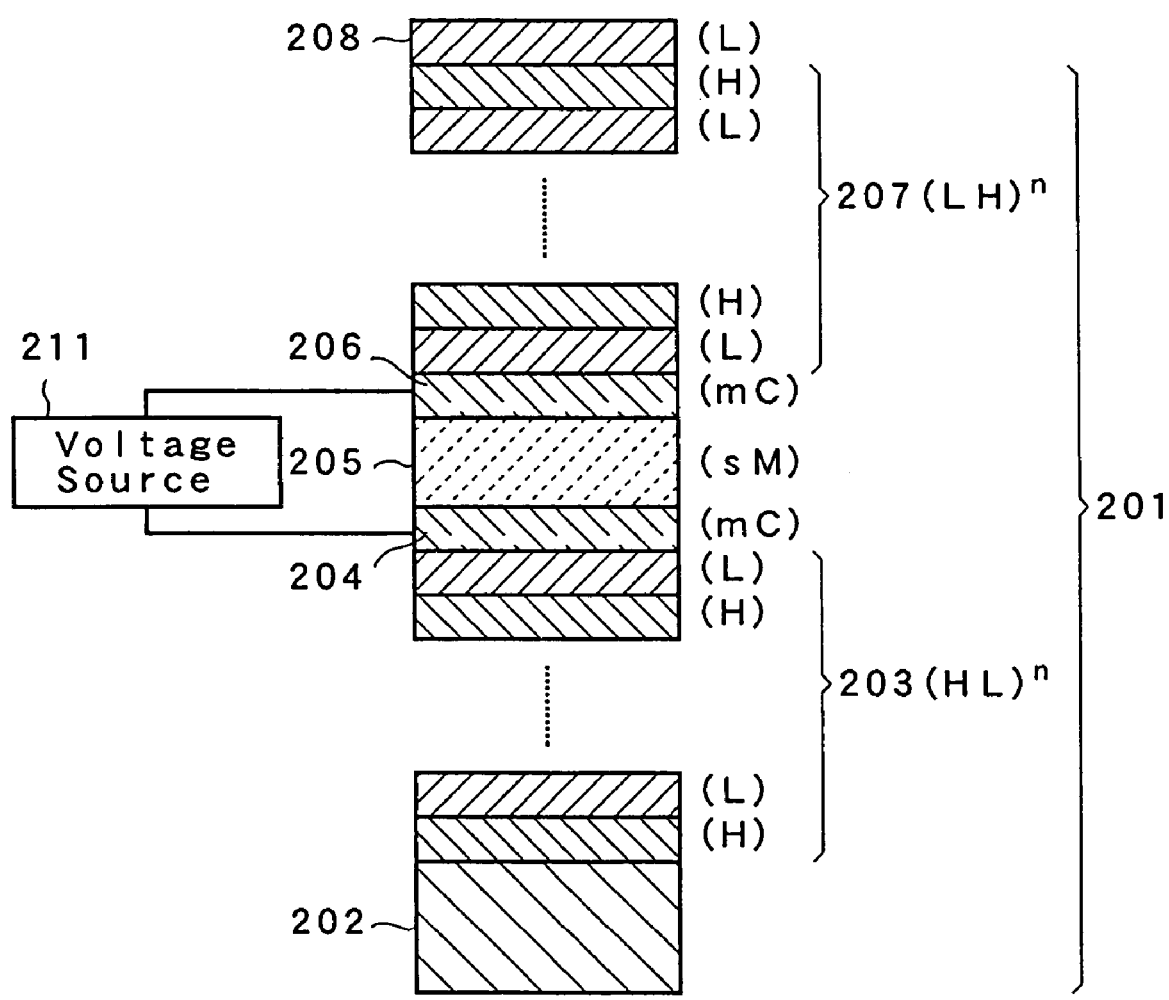
FIG. 4 is a main-portion cross-sectional view that shows the outline of a structure of an optical element in accordance with a first embodiment of the present invention.

Next, the following description will discuss a first embodiment of the present invention. FIG. 4 shows the outline of the structure of an optical element 201 in accordance with of the first embodiment of the present invention. This optical element 201 has a structure in that a first mirror stack layer 203 is formed on a substrate 202 with a first conductive thin film 204 being formed thereon. The layer 203 and film 204 constitute a first composite stack layer.

Then, a spacer layer 205, which is a paraelectric layer that exerts a secondary electrooptic effect, is formed thereon. Moreover, a second composite stack layer, constituted by a second conductive thin film 206 and a second mirror stack layer 207, is formed thereon. A coupling layer 208 is further formed thereon to form a basic structure. The coupling layer 208 (low-refractive index dielectric thin film L forming the uppermost layer), located on the second mirror stack layer 207, is made in contact with a medium. This optical element 201 is used as, for example, a single cavity-type bandpass filter.

Each of the first mirror stack layer 203 and the second mirror stack layer 207 is constituted by a plurality of sets of two kinds of different dielectric substance H and dielectric substance L, both having a physical film thickness of a ¼-wavelength of the design wavelength, which are laminated.

In the optical element 201 in the first embodiment shown in FIG. 4, a Fabry-Perot resonator structure represented by the following expression structure (11) is prepared in order to achieve a tunable characteristic.

$$B=[(HL)^n kC\ sM\ kC\ (LH)^n L] \quad (11)$$

Here, symbol C represents a conductive thin film. Symbol M represents a paraelectric film having an electrooptic effect. Each of these films C and M is a physical film thickness with the ¼-wavelength. Coefficient k indicates an odd number (1, 3, 5, . . . ), and coefficient s represents an even number (2, 4, 6, . . . ). That is, in expression structure (11), the dielectric substance layer H that is made in contact with the spacer layers of the first and second mirror stack layer in expression structure (10) is replaced by a conductive thin film having a film thickness kC, that is, the first conductive thin film 204 and the second conductive thin film 206. Moreover, the spacer layer 205 is prepared as a paraelectric material with a film thickness of sM, which has a secondary electrooptic effect.

With respect to the film material used for film-forming an electrooptical thin film constituting the spacer layer 205, a film having a multicrystal film structure, that is, in particular, an epitaxial film, is desirably used. With respect to the film-forming method, any of the following known methods may be used: electron beam vapor deposition method, ion-assist vapor deposition method, DC magnetron sputtering method, RF magnetron sputtering method, ion plating method, ion-beam sputtering method, molecular-beam epitaxy (MBE) method, chemical vapor phase deposition (CVD) method, dip coating method and pulse-laser deposition method. In any of these film-forming methods, upon carrying out adjustments, such as adjustments in a flow rate and an addition concentration of a gas supply (such as oxygen gas), and adjustments in the current and voltage level of a beam current and the degree of vacuum during film-forming processes, the film of the present invention makes it possible to easily control these factors. Moreover, this makes it possible to control crystallinity and also to provide a smooth thin-film interface, by optimizing the film-forming temperature.

In the optical element 201 in accordance with the first embodiment, a voltage source 211 serving as a characteristic controlling unit is connected to the first and second conductive thin films 204 and 206. By changing voltage V to be applied between the conductive thin films 204 and 206 using the voltage source 211, the tunable characteristic is achieved. The following description discusses the frequency response at this time.

In the optical element 201, the conductive thin films 204 and 206, which are made in contact with the mirror stack layers 203 and 207, have a finite electrical resistance value R, and a paraelectric material forming the spacer layer 205 has a capacitance $C_s$; and the product of these values limits the time response. Here, it supposes that the resistivity of the first and second conductive thin films 204 and 206 is ρ[Ωcm] and that the surface area of these is S. In this case, the resistance value R and the capacitance $C_s$ are respectively represented by the following equations (12) and (13), supposing that the film thickness of the conductive thin films 204 and 206 is kC and that the film thickness of the spacer layer 205 is sM:

$$R=\rho(kC/S) \quad (12)$$

$$C_S=\epsilon_r \cdot \epsilon_0 \cdot (S/sM) \quad (13).$$

Here, symbol $\epsilon_r$ represents a relative dielectric constant of the paraelectric material which constitutes the spacer layer 205, and symbol $\epsilon_o$ represents the dielectric constant of the vacuum.

Incidentally, the present specification defines each of the terms as follows:

"The polycrystal film" indicates a film state where, although it is in a single phase state, a variety of surface indexes intermingle with one another due to the θ-2θX ray diffraction pattern. That is, the film state is identified as that the diffraction strength to support a crystal azimuth is equal to or more than 1% in the diffraction strength as a whole.

"The oriented film" refers to the case where, in a polycrystal film, one surface index and high-order peaks thereof further appear due to the θ-2θX ray diffraction pattern.

"The epitaxial film" refers to an oriented film which includes "an in-plane randomly oriented film", "an in-plane selectively oriented film", and "an in-plane oriented film" and the like. In "an in-plane randomly oriented film", in-plane crystal azimuths are randomly set depending on the respective crystal grains. In "an in-plane selectively oriented film", crystal grains, oriented in two or more kinds of specific directions, are present in a mixed manner. In "an in-plane oriented film", crystal grains are completely oriented in one direction, due to X-ray pole figure, RHEED (Reflection High-speed Electron-beam Diffraction), LEED (Low-speed Electron-beam Diffraction). In the case of the in-plane oriented film, a bulk electrooptic coefficient is substantially realized by a thin film; however, in the case of the other oriented films and polycrystal films, this is achieved when the electrooptic coefficient is reduced.

With respect to the spacer layer having an electrooptic effect in the present invention, a polycrystal film, an oriented film or an epitaxial film, except for the amorphous film and the multi-phase film, can be used.

Here, in the optical element 201 of the present embodiment, a variety of materials, which are transparent within a wavelength range to be used (for example, optical crystals, optical glass, quartz, transparent plastics, or polymer materials), may be used as the substrate 202. With respect to the dielectric thin film that constitutes the first and second mirror stack layers 203 and 207, those materials that are selected from generally-used materials at present, and are transparent within a wavelength range to be used with a refractive index ranging from 1.23 to 5.67, may be used. Selection is made of the following optical materials: calcium fluoride $CaF_2$ (refractive index: 1.23), magnetism fluoride $MgF_2$ (refractive index: 1.38), silicon dioxide $SiO_2$ (refractive index: 1.46), magnesium oxide MgO (refractive index: 1.80), tantalum pentoxide $Ta_2O_5$ (refractive index: 2.15), niobium pentoxide $Nb_2O_5$ (refractive index: 2.24), titanium dioxide $TiO_2$ (refractive index: 2.45), zinc selenide ZnSe (refractive index: 2.40), lead terrarium PbTe (refractive index: 5.67), aluminum nitride AlN (refractive index: 1.94), silicon nitride $Si_3N_4$ (refractive index: 1.95), silicon Si (refractive index: 3.4) and germanium Ge (refractive index: 4.0). When an optical thin film is formed by using any of these materials, the various film-forming methods as described earlier may be used.

Upon designing multilayer films for forming the filter, the film designing software which is marketed at present can be used. Examples thereof include pieces of software, such as TFCalc (Software Spectra, Inc.) and Essential Macleod (Thin-Film Center, Inc.), which are mainly used in the optical communication industry and are applicable to the present invention in the same manner.

The advantages of the optical element 201 of the present embodiment are summarized as follows:

(1) By altering a film design, it is possible to achieve a tunable optical filter which has an optional bandpass width and a wavelength signal removing characteristic for the other signals having different wavelengths.

(2) Because it adopts a tunable method by the use of refractive index control, no mechanical driving part is required, making it possible to provide superior reliability.

(3) For example, in the case of realizing a tunable optical filter by using mechanical driving processes, the resulting response speed is set to about 0.1 to 1 second; however, the optical element 201 of the present embodiment achieves a response speed, for example, not less than 1 million times faster than the above-mentioned response speed, so that the wavelength can be varied, for example, at a speed of not more than μs (micro second).

(4) In the case of a tunable bandpass filter that uses a conventional film thickness gradient, the size of the device as a whole is generally as large as $30\times30\times80$ $mm^3$. In contrast, the size of the filter chip itself of the optical element 201 of the present embodiment is set to not more than 2 $mm^2$. Therefore, the size of the device as a whole is made as small as $10\times10\times10$ $mm^3$, making it possible to provide a small-size device. The volume ratio is made as small as 1/70.

(5) The conventional tunable bandpass filter using a film thickness gradient requires a mechanical driving part such as a shifting stage. The optical element 201 of the present embodiment, however, only requires application of a voltage so that it is possible to produce the entire device at low costs.

(6) In the case of the conventional tunable optical filter using liquid crystal, since a power source that supplies an AC driving current is required, it is not possible to fix the filter wavelength to a desired value. The optical element 201 of the present embodiment, however, can be DC-driven so that the filter wavelength is desirably fixed.

The application of the present invention is not intended to be limited to the bandpass filter, and the present invention is applied to almost all the optical elements that are used in the dielectric multilayer film structure, such as a reflection-reducing coating, high reflection mirror, lowpass filter, highpass filter and band elimination filter (rugate filter).

As shown in expression structure (11), the present embodiment uses a single cavity type element. However, the present embodiment may be applied to an optical element of an m-multiplex cavity type in which a plurality of these cavities are laminated. Here, m indicates an integer of not less than 2. Since a characteristic controlling unit is installed in each of the cavities, an applied voltage is controlled for each of the cavities so that characteristic controlling operations for transmission of light rays, or the like, can be carried out for each of the cavities.

Here, an oxide paraelectric single crystal substrate with two faces optically polished that has a secondary electrooptic effect may be used as the spacer layer. The thickness of the substrate may be set in the range from 10 μm to 10 mm. When the thickness of the substrate is set within this range, an optical element such as a tunable optical filter and a tunable Fabry-Perot etalon-type filter may be prepared. The thickness of the substrate of not more than 10 μm tends to cause cracks during polishing processes and the subsequent difficulty in handling; therefore, this is not suitable for the practical use. In such a case, an oxide paraelectric thin film having the secondary electrooptic effect is vapor-deposited on the composite stack layer as a spacer layer as will be described below; thus, it becomes possible to form a resonator structure with multiple stages, which is easily handled.

Here, with respect to the oxide paraelectric material that serves as the spacer and has the secondary electrooptic effect, a material having the following composition may be used: $Pb_{1-x}La_x(Zr_{1-y}Ti_y)_{1-x/4}O_3$, ($0 \leq x < 1.0$, $0 \leq y \leq 1.0$). In this formula, when X and Y satisfy the conditions indicated by the brackets, the material is allowed to exhibit a paraelectric phase in a temperature range from $-40°$ C. to $+85°$ C., which includes room temperature.

Moreover, with respect to the oxide paraelectric material that has the secondary electrooptic effect, and is used as the spacer layer, a material having the following composition may be used: $Sr_xBa_{1-x}TiO_3$ ($0.3 \leq X \leq 1.0$). In this formula, when X satisfies the conditions indicated by the bracket, the material is allowed to exhibit a paraelectric phase in a temperature range from $-40°$ C. to $+85°$ C., which includes room temperature.

Furthermore, with respect to the oxide paraelectric material that has the secondary electrooptic effect, and is used as the spacer layer, a material having the following composition may be used: $KTa_xNb_{1-x}O_3$ ($0.5 \leq X \leq 1.0$). In this formula, when X satisfies the conditions indicated by the bracket, the material is allowed to exhibit a paraelectric phase in a temperature range from $-40°$ C. to $+85°$ C., which includes room temperature.

Any one of the polycrystal, oriented and epitaxial oxide paraelectric thin films that are vapor-deposited on the first or second composite stack layer and have the secondary electrooptic effect may be used as the spacer, with its thickness being set in the range from 10 nm to 50 μm. With this thickness range, the device can be used as a tunable optical filter ranging from an ultraviolet area having a wavelength of 400 nm to an infrared area.

Moreover, with respect to the conductive film, ZnO, which forms an oxide transparent conductive film, may be used. Here, ZnO has superior transparency in an infrared area from a wavelength of 1 μm to that of 2 μm, and is suitably used as an infrared tunable optical filter. Here, by further adding materials such as Al (aluminum), Ga (gallium), In (indium), B (boron), F (fluorine) and N (nitride) to ZnO, it becomes possible to decrease the resistivity.

With respect to the conductive film, ITO (Sn : $In_2O_3$), which forms an oxide transparent conductive film, may be used. Here, ITO has superior transparency within a visible range from a wavelength of 0.5 μm to that of 0.8 μm, and is suitably used as a visible-range tunable optical filter.

Moreover, with respect to the conductive film, $Cd_2SnO_4$, which forms an oxide transparent conductive film, may be used. Here, $Cd_2SnO_4$ has superior transparency in an infrared area from a wavelength of 1 μm to that of 2 μm, and is suitably used as an infrared tunable filter.

With respect to the conductive film, $ZnSnO_3$, which forms an oxide transparent conductive film, may be used. Because $ZnSnO_3$ has a perovskite-type crystal structure and because its lattice constant is close to the lattice constant, 3.90 to 4.1 angstroms, of the oxide paraelectric material having the same perovskite-type crystal structure, it is suitable for the epitaxial film forming.

With respect to the conductive film, $AgSbO_3$, which forms an oxide transparent conductive film, may be used. Because $AgSbO_3$ has a perovskite-type crystal structure and its lattice constant is close to the lattice constant, 3.90 to 4.1 angstroms, of the oxide paraelectric material having the same perovskite-type crystal structure, it is suitable for the epitaxial film forming.

Second Embodiment

The following description will discuss the embodiments of the present invention by exemplifying cases in which the optical element is practically applied to a bandpass filter.

Figure 5:
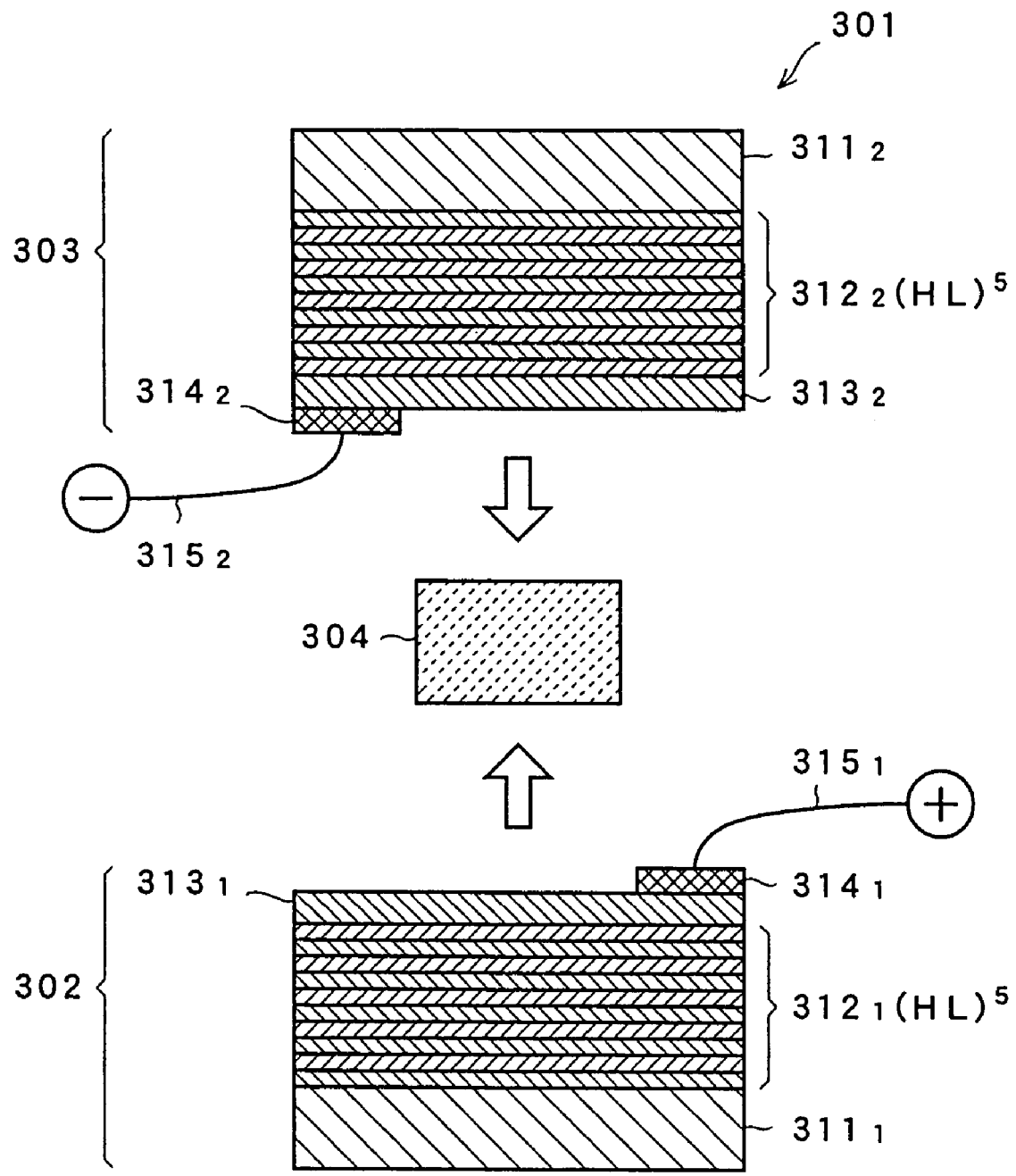
FIG. 5 is an explanatory diagram that shows the principle of a structure of a tunable etalon in accordance with a second embodiment of the present invention.

FIG. 5 shows the structure of a tunable etalon in accordance with a second embodiment of the present invention theoretically. Here, the etalon is an optical element in which an illuminator is formed on the inside of an optical flat. A tunable etalon 301 of the present embodiment may be used as, for example, a tunable optical filter, and has its design wavelength $\lambda_0$ of 1550 nm.

The tunable etalon 301 has a structure in that each of first and second composite stack layers 302 and 303 is joined to each of two surfaces of a spacer layer 304. Here, the first composite stack layer 302 has a structure in that: a first mirror stack layer $312_1$ is laminated on a BK7 glass substrate $311_1$ made of borosilicate glass; a transparent conductive film $313_1$ is vapor deposited on the entire surface thereof; and an Nb metal electrode $314_1$ is formed on one portion of four corners of the upper surface. Positive potential is applied to the Nb metal electrode $314_1$ through a lead line $315_1$. A first mirror stack layer $312_1$ has a structure in that five sets of a high-refractive index dielectric thin film H and a low-refractive index dielectric thin film L, which serve as two kinds of dielectric thin films having different refractive indexes, are stacked. The high-refractive index dielectric thin film H is an $Nb_2O_5$ film (refractive index $n_H$=2.24), and the low-refractive index dielectric thin film L is a $SiO_2$ film (refractive index $n_L$=1.46). The transparent conductive film $313_1$ is a ZnO film (refractive index $n_C$=1.95). The transparent conductive film $313_1$ serves as a transparent conductive film in the vicinity of a wavelength of 1550 nm, and has resistivity of not more than 0.01 Ωcm.

The second composite stack layer 303 has completely the same structure as the first composite stack layer 302. Therefore, in the second composite stack layer 303 shown in the figure, the same part, which is indicated by "1" in the subscript part that shows each part in the first composite stack layer 302, is indicated by "2", and the description thereof is omitted. However, negative potential is applied to an Nb metal electrode $314_2$ in the second composite stack layer 303 through a lead line $315_2$.

With respect to the spacer layer 304, a single crystal substrate, made of a material that has the secondary electrooptic effect, and is represented by the following composition, is used: $Pb_{1-X}La_X(Zr_{1-Y}Ti_Y)_{1-X/4}O_3$ (where X=0.09, Y=0.35) (hereinafter, referred to as PLZT (transparent ceramics)). Here, the refractive index ($n_M$) of the spacer layer 304 is 2.5. The PLZT single crystal substrate has a thickness of 0.1 mm, with two surfaces optically polished. The crystal azimuth is (001). Air having the refractive index of 1.0 is used as the external medium. The film structure B of the tunable etalon 301 of the present embodiment is represented by the following expression structure (14):

$$B=(HL)^5 5C\ sM\ 5C\ (LH)^5 \qquad (14).$$

Here, paradielectric (sM) is equivalent to 0.1 mm in thickness.

Referring to FIG. 5, the following description will discuss a manufacturing method for this tunable etalon 301. In the case where, upon manufacturing the first composite stack layer 302, the thickness $t_2$ of the BK7 glass substrate $311_1$ is set to 2 mm. A total ten layers of $Nb_2O_5$ films serving as the high-refractive index dielectric thin film H and $SiO_2$ films serving as the low-refractive index dielectric thin film L are alternately laminated on the entire surface of the BK7 glass substrate $311_1$ having a size of $20\times20\times t_2$ mm³ by using an ion-assist vapor deposition method. With respect to the physical film thickness of the ¼-wavelength of the respective high-refractive index dielectric thin film H and the low-refractive index dielectric thin film L, that of the high-refractive index dielectric thin film H is 173 nm, and that of the low-refractive index dielectric thin film L is 265 nm.

Next, the transparent conductive film $313_1$ (indicated by 5C in expression structure (14)) made of a ZnO film is vapor-deposited on the entire surface of the mirror stack layer $312_1$ with a thickness of 1174 nm. The ZnO film is an intrinsic semiconductor in which conductivity is generated by the oxygen deficit. Therefore, the oxygen gas flow rate is adjusted so that the film is formed with the resistivity being set at 0.01 Ωcm. At this time, the transparent conductive film $313_1$ functions as a superior transparent conductive film having an attenuation coefficient of not more than $10^{-3}$ that serves as a light absorbing coefficient of the thin film. Successively, an Nb metal electrode $314_1$ is vapor-deposited on one portion of four corners of the upper surface of the transparent conductive film $313_1$ for electrode formation, with a thickness of 200 nm. The lead line $315_1$ is connected to the Nb metal electrode $314_1$ by using a silver paste agent.

The second composite stack layer 303 is manufactured by using completely the same manufacturing method as the first composite stack layer 302. These first composite stack layer 302 and second composite stack layer 303 are arranged so that the transparent conductive films $313_1$, $313_2$ and the Nb metal electrodes $314_1$, $314_2$ are respectively aligned face to face with each other, and made in contact with the respective faces of the spacer layer 304 that have been optically polished. Upon contacting, the corresponding processes are carried out under sufficiently clean environments so as to prevent dusts entering the gap between the PLZT monocrystal substrate serving as the space layer 304 and the transparent conductive films $313_1$ and $313_2$. The BK7 glass substrates $311_1$ and $311_2$ are preliminarily subjected to washing processes so as to remove stains from the surfaces thereof.

In this manner, the tunable etalon 301 serving as a Fabry-Perot etalon can be prepared. Randomly polarized light rays are externally made incident on the tunable etalon 301 perpendicularly with a DC voltage being applied in the thickness direction; thus, the wavelength having a periodic transmission spectral characteristic is changed.

Figure 6:
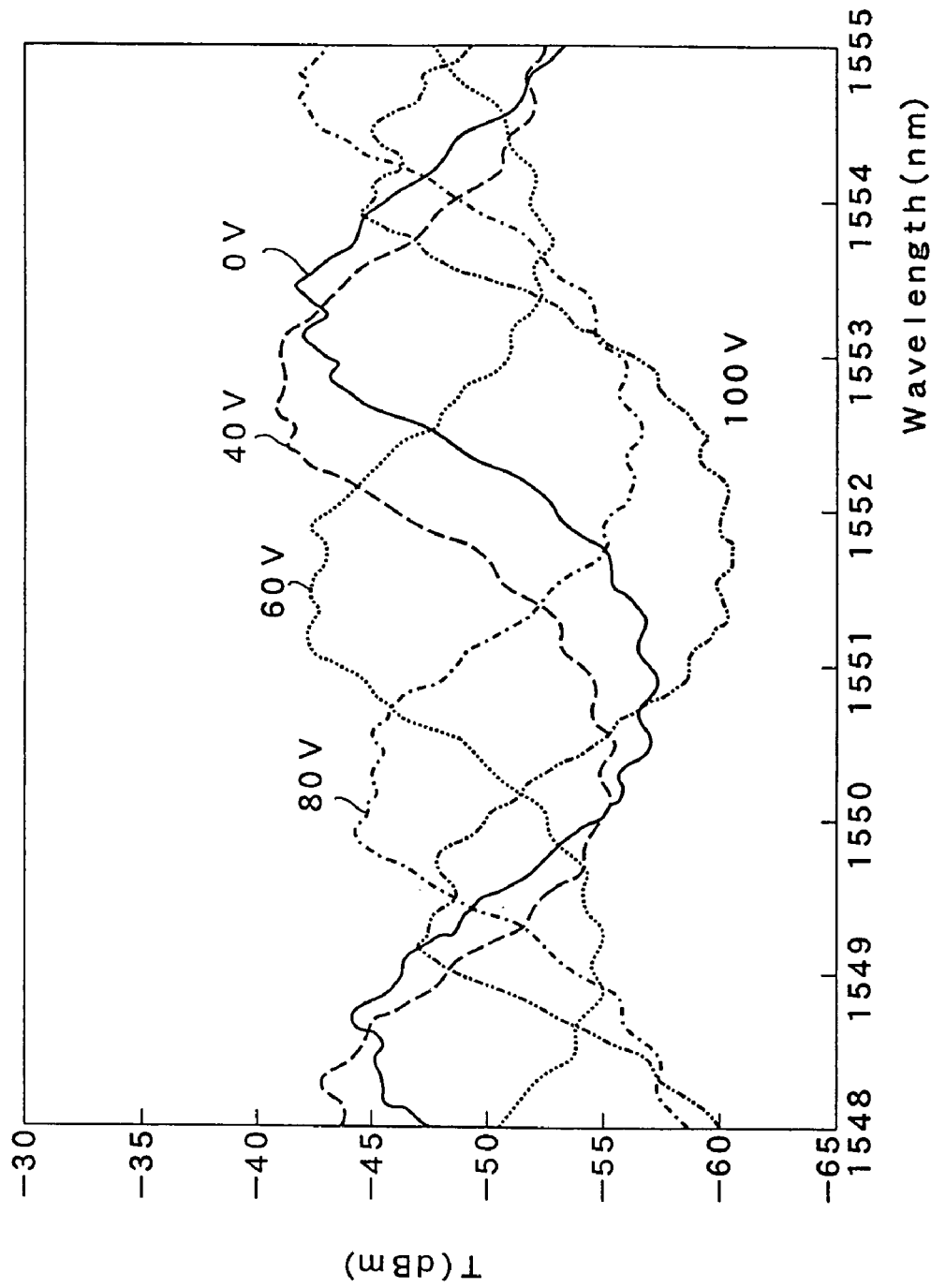
FIG. 6 is a performance mapping that shows a spectrum variable property of the tunable etalon of the second embodiment of the present invention.

FIG. 6 shows the spectral variable characteristic of the tunable etalon in accordance with the second embodiment. When the voltage to be applied across the Nb metal electrodes $314_1$ and $314_2$ of the tunable etalon 301 is changed from 0 V to 100 V, the spectral characteristic in the periodic transmission wavelength of the etalon is allowed to change. In the case of the applied voltage of 100 V, the amount of wavelength shift was −3.8 nm. This corresponds to a change of −0.0064 in the refractive index.

Figure 7:
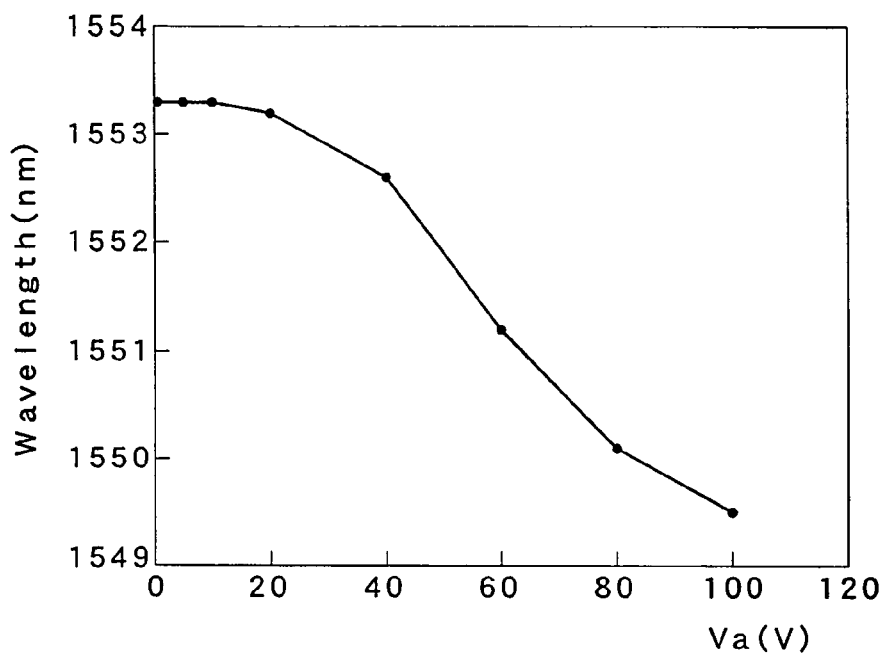
FIG. 7 is a performance mapping that shows a tunable characteristic of the tunable etalon of the second embodiment of the present invention.

FIG. 7 shows the tunable characteristic of the tunable etalon in accordance with the second embodiment. As shown in FIG. 7, the wavelength shift is generated in the negative direction in proportion to the square of the voltage Va applied across the Nb metal electrodes $314_1$ and $314_2$ of the tunable etalon 301. By using the above-mentioned equation (2), the secondary electrooptic coefficient $R_{ij}$ is represented by the following expression (15):

$$R_{13}=R_{23}=1.0\times10^{-15} \text{ m}^2/\text{V}^2 \quad (15).$$

This substantially agrees with the coefficient which is reported with respect to the single crystal substrate. It is found that no difference in the refractive index change occurs with respect to orthogonal components in polarization, such as polarization dependency, due to an increase in the applied voltage.

Here, the response speed of the tunable etalon 301 of the second embodiment is limited by the RC time constant which is derived from the resistance value R of the ZnO conductive film and the capacitance $C_s$ of the PLZT paraelectric material that forms the spacer layer 304. When the above-mentioned expressions (12) and (13) are used, response time of 2 μs is obtained in the present embodiment. By using the tunable etalon 301 of the present embodiment, it becomes possible to achieve a tunable etalon having a tunable characteristic of about 4 nm with high speed.

Here, in the tunable etalon 301 of the present embodiment, since the thickness of the PLZT single crystal substrate used for the spacer layer 304 is as thin as 0.1 mm, the first and second composite stack layers 302 and 303 are formed and prepared in a separate manner respectively so as to sandwich the spacer layer 304. However, the present invention is not intended to be limited by this arrangement. For example, in the case where the paraelectric single crystal material that constitutes the spacer layer 304 of the secondary electrooptic effect has a thickness of not less than 0.5 mm, conductive thin films are vapor deposited on both of the surfaces thereof, and the first and second mirror stack layers $312_1$ and $311_2$ may be further formed on both of the end faces thereof; thus, this method also makes it possible to produce a tunable etalon.

Third Embodiment

Figure 8:
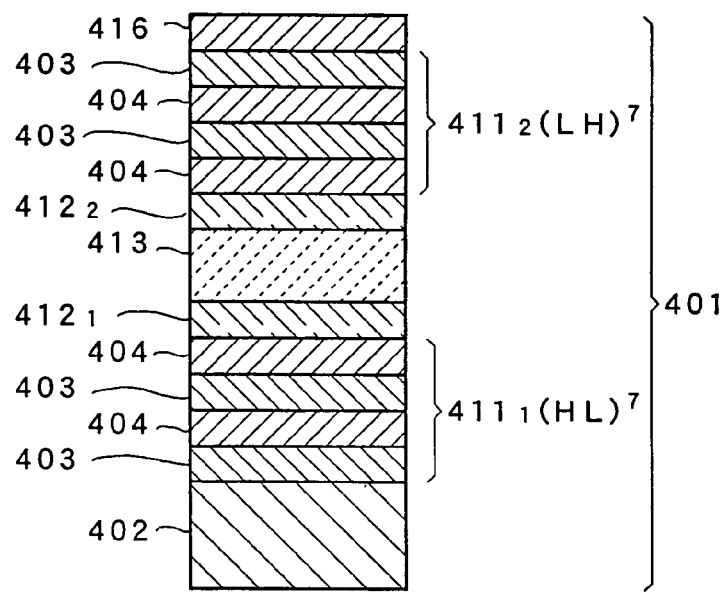
FIG. 8 is a main-portion cross-sectional view that shows a single cavity-type tunable bandpass filter in accordance with a third embodiment of the present invention.

FIG. 8 shows the cross-sectional structure of a single cavity-type tunable bandpass filter with no electrode attached thereto, in accordance with the third embodiment of the present invention. A single cavity-type tunable bandpass filter 401 has a structure in that a first mirror stack layer $411_1$ is formed on a BK7 glass substrate 402. With respect to the first mirror stack layer $411_1$, a $Ta_2O_5$ film is used as a dielectric thin film 403, that is, the high-refractive index dielectric thin film H, and an $SiO_2$ film is used as the low-refractive index dielectric thin film L, and seven sets of these films are laminated (in the figure, only two sets are briefly shown). An ITO film (refractive index: $n_c$=2.0) is formed as a transparent conductive film $412_1$ on the stack layer $411_1$. The transparent conductive film $412_1$ serves as a transparent film in the vicinity of a wavelength of 500 nm, and has resistivity of $4\times10^{-4}$ Ωcm.

A spacer layer 413 is formed on the transparent conductive film $412_1$. A PLZT thin film having the secondary electrooptic effect is used as the spacer layer 413. The refractive index ($n_M$) of this thin film is 2.5. Air having the refractive index of 1.0 is used as the external medium. A transparent conductive film $412_2$ is formed on the spacer layer 413, and a second mirror stack layer $411_2$ having the same structure as the first mirror stack layer $411_1$ is further formed thereon. A coupling layer 416, which is a low-refractive index dielectric thin film L corresponding to the uppermost layer, is formed thereon.

The film structure B of the single cavity-type tunable bandpass filter 401 of the third embodiment is represented by the following expression structure (16):

$$B=(HL)^7 5C\ 6M\ 5C(LH)^7 L \quad (16).$$

FIG. 9 shows manufacturing processes for the single cavity-type tunable bandpass filter in accordance with the third embodiment. The design wavelength $\lambda_0$ of the tunable bandpass filter is 500 nm.

Figure 9A:
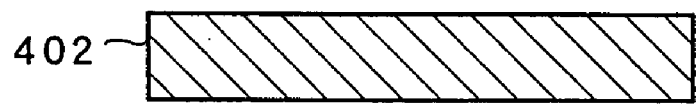
FIGS. 9A to 9H are cross-sectional views that show the single cavity-type tunable bandpass filter of the third embodiment of the present invention.

First, as shown in FIG. 9A, in the first process, a BK7 glass substrate 402 having a clean surface is prepared. The size of this substrate is 10 mm×100 mm, with a thickness of $t_2$ mm. In the present embodiment, based upon the BK7 glass substrate 402 having this size, various layers are formed thereon, and nine single cavity-type tunable bandpass filters 401 are finally manufactured.

Figure 9B:
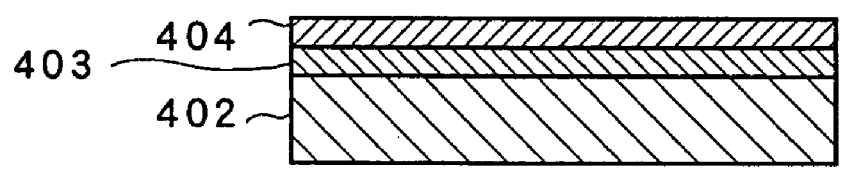

Next, in the second process shown in FIG. 9B, a film-forming temperature is set at 600° C. in a vacuum chamber that has been sufficiently vacuumed. Then, by using a magnetron sputtering process, a dielectric thin film serving as the high-refractive index dielectric thin film H, that is, a $Ta_2O_5$ film (refractive index $n_H$=2.16) 403, is formed on one surface of the BK7 glass substrate 402, and an $SiO_2$ film (refractive index $n_L$=1.46) 404 serving as the low-refractive index dielectric thin film L is formed thereon. A plurality of these dielectric thin films, that is, $Ta_2O_5$ films 403 and $SiO_2$ films 404, are successively laminated thereon alternately. The physical film thicknesses of a ¼-wavelength of the design wavelength of the high-refractive index dielectric thin film H is 58 nm and the low-refractive index dielectric thin film L is 86 nm. In FIG. 9B, only one layer of each of the dielectric thin films, the $Ta_2O_5$ film 403 and the $SiO_2$ film 404, is shown; however, by laminating seven sets of these films, the first mirror stack layer $411_1$ of the present embodiment shown in FIG. 8 is completed.

Figure 9C:
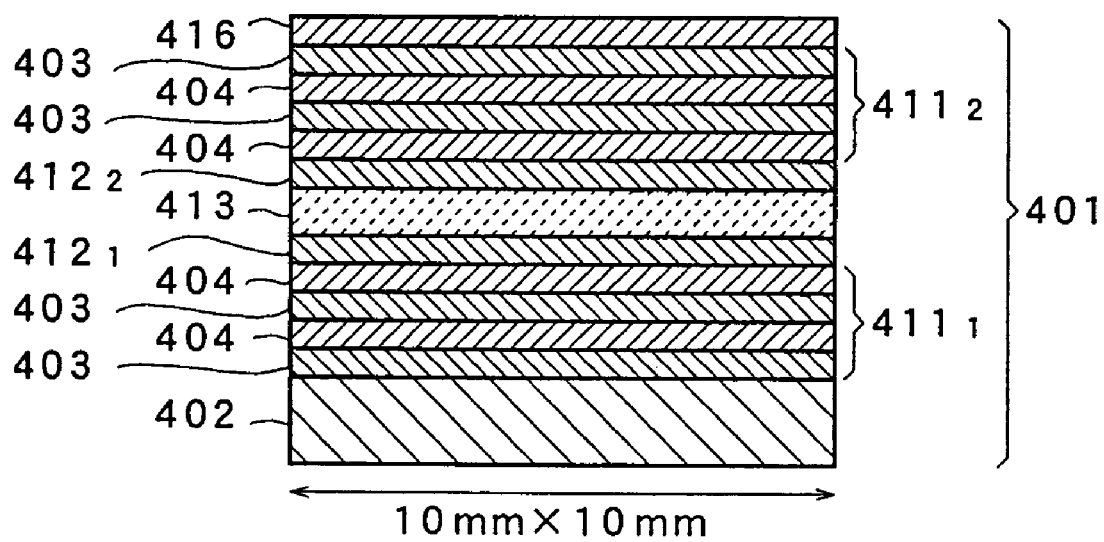

FIG. 9C shows the third process. On the first mirror stack layer $411_1$, an ITO film (indicated by "5C" in expression structure (16)) is vapor-deposited as a transparent conductive film $412_1$ that forms a lower-surface conductive film with a thickness of 313 nm. The ITO film has its conductivity changed depending on the added amount of Sn atoms. Therefore, by adjusting the added amount of Sn atoms, the film-forming process is carried out so that the resistivity is set at $4\times10^{-4}$ Ωcm. Thus, the resulting film functions as a superior transparent conductive film having an attenuation coefficient of not more than $10^{-4}$.

Successively, the PLZT film is laminated with a thickness of 300 nm (corresponding to "6M" in expression structure (16)) as a spacer layer 413. An ITO film, which serves as a transparent conductive film $412_2$ to form an upper-surface conductive film is vapor-deposited thereon with a thickness of 313 nm (corresponding to "5C" in expression structure (16)). Further, a second mirror stack layer $412_2$ (corresponding to "(LH)$^7$" in expression structure (16)) is further formed thereon. Lastly, a coupling layer 416 is vapor-deposited thereon with the same physical film thickness of the ¼-wavelength (86 nm).

When the film thus formed was evaluated by using the θ-2θX ray diffraction pattern, it was found that although it is in a single phase state, a plurality of surface indexes intermingle with one another and the diffraction strength corresponding to the crystal azimuth is set to about 10% of the entire diffraction strength. For this reason, the resulting film was confirmed to be a polycrystal thin film. Here, upon controlling a film thickness monitor, a single wavelength laser having a wavelength of 500 nm is made incident on the substrate 402 perpendicularly, and the transmissibility during film-forming processes is monitored by an optical film-thickness monitor. In the case where the film thickness is set to the physical film thickness of the ¼-wavelength during the film-forming processes, the transmissibility exhibits a maximum value or a minimum value so that it becomes possible to carry out film-forming controlling processes with high precision. In the case of the spectral line width is not more than 0.01 nm, the film thickness precision of 0.1 nm is obtained.

Figure 9D:
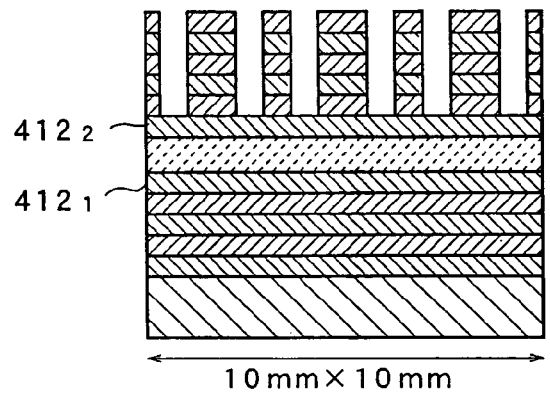
Figure 9E:
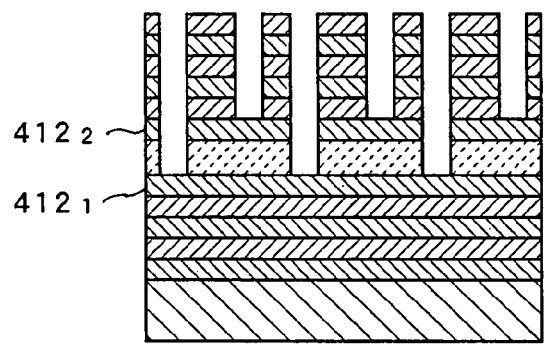

Next, processes for attaching electrodes to the transparent conductive film $412_1$ and the transparent conductive film $412_2$ formed in the third process are carried out. First, in the fourth process as shown in FIG. 9D, an etching process is carried out up to the upper surface of the transparent conductive film $412_2$ that is the upper-surface conductive thin film by dry etching. Further, in the fifth process as shown in FIG. 9E, an etching process is carried out up to the upper surface of the transparent conductive film $412_1$ that is the lower-surface conductive thin film. Also in the case of etching, the etched amount is controlled with high precision by using the optical film-thickness monitor.

Figure 9F:
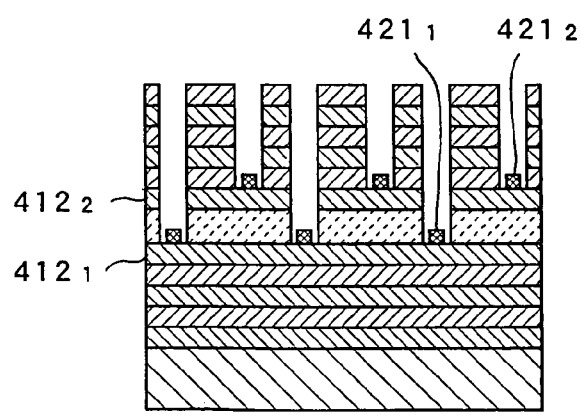

In the sixth process as shown in FIG. 9F, a metal electrode $421_2$ is formed on the transparent conductive film $412_2$ and a metal electrode $421_1$ is formed on the transparent conductive film $412_1$, respectively. With respect to the material for the metal electrode 421, a Ti/Au or Ti/Pt metal thin film, which has high adhesion strength, is used. In the case of the former Ti/Au, Ti is vapor-deposited with a thickness of 50 nm, and an Au thin film is laminated thereon with a thickness of 200 nm. In the case of the latter Ti/Pi, Ti is vapor-deposited with a thickness of 50 nm, and a Pt thin film is laminated thereon with a thickness of 200 nm.

Figure 9G:
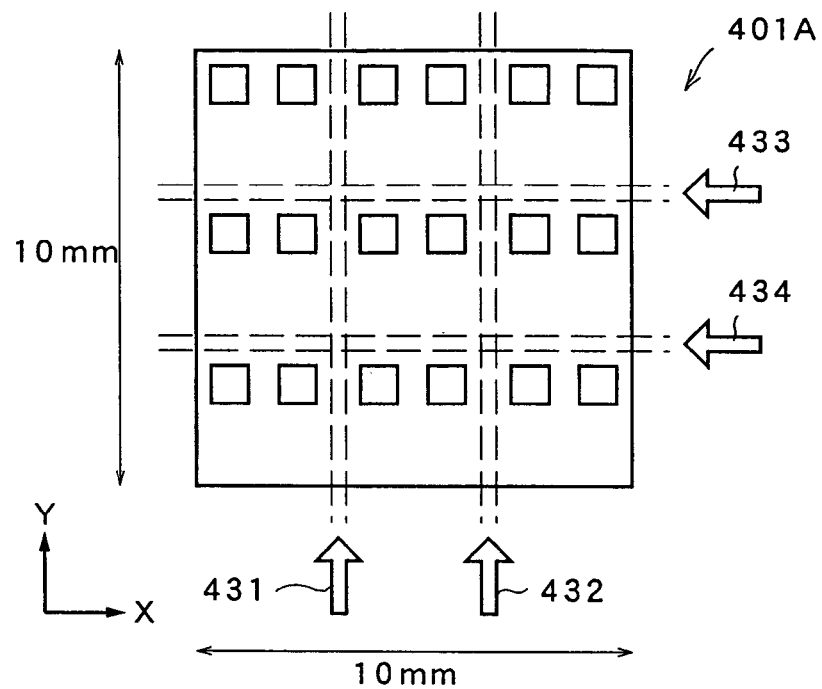

In the seventh process as shown in FIG. 9G, this tunable bandpass filter having a length of 10 mm in each of X and Y directions in the figure is divided into three portions in the respective length directions. In other words, the dividing processes are carried out so that, after the dividing processes, each width of portions divided at the respective positions shown by arrows 431 to 434 is allowed to have 3 mm in the Y direction and the X direction. In this manner, nine tunable bandpass filter chips 401A are produced.

Figure 9H:
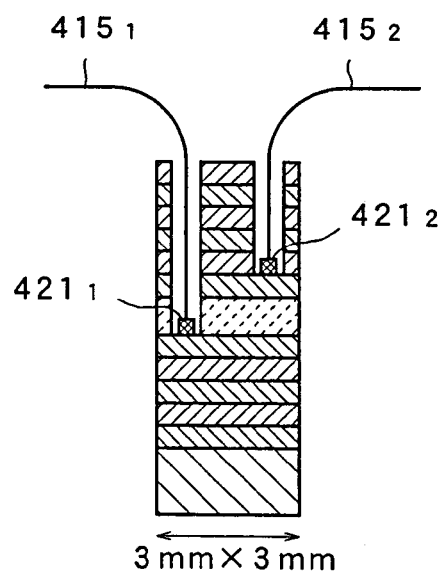

FIG. 9H shows the eighth process. With respect to one of the tunable bandpass filter chips 401A obtained in the seventh process, lead lines $415_1$ and $415_2$ are wire-bonded to the corresponding metal electrodes $421_1$ and $421_2$ thereof. The other ends of the lead lines $415_1$ and $415_2$ are connected to a voltage source (not shown).

Figure 10:
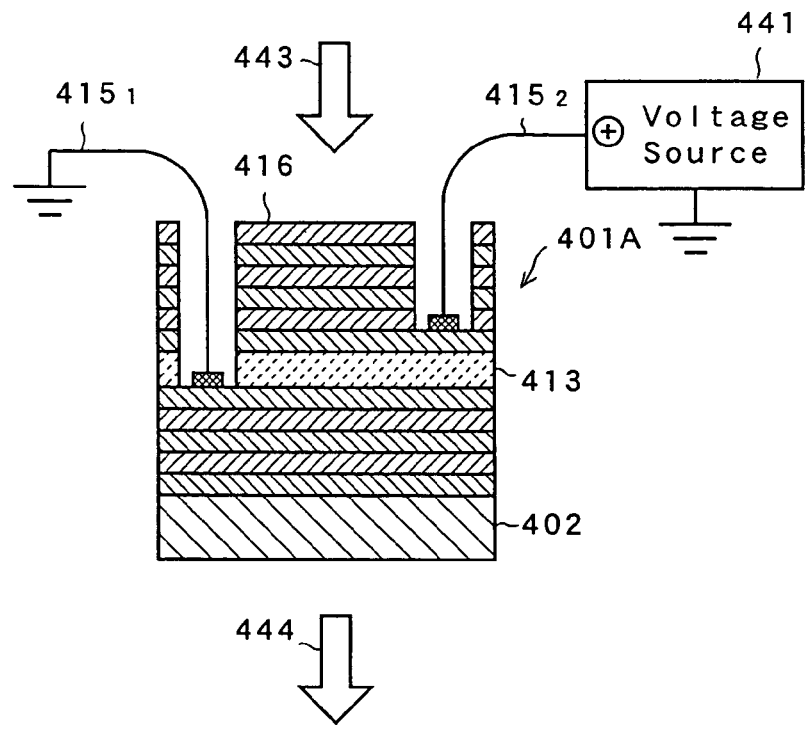
FIG. 10 is an explanatory diagram that shows use condition of a tunable bandpass filter chip of the third embodiment.

FIG. 10 is a diagram that explains the applied state of the tunable bandpass filter chip manufactured as described above. The lead line $415_1$ of the bandpass filter chip 401A is connected to ground and the other lead line $415_2$ is connected to the plus potential side of a voltage source 441. The other end of the voltage source 441 is connected to ground. Randomly polarized light rays 443 are perpendicularly made incident on the bandpass filter chip 401A on the coupling layer 416 side, and transmitted light rays 444 are obtained from the BK7 glass substrate 402 side. Further, a DC voltage is applied thereto in the thickness direction of the spacer layer 413. Consequently, light-ray components corresponding to the center wavelength of the tunable bandpass filter are allowed to pass as transmitted light rays 444.

Figure 11:
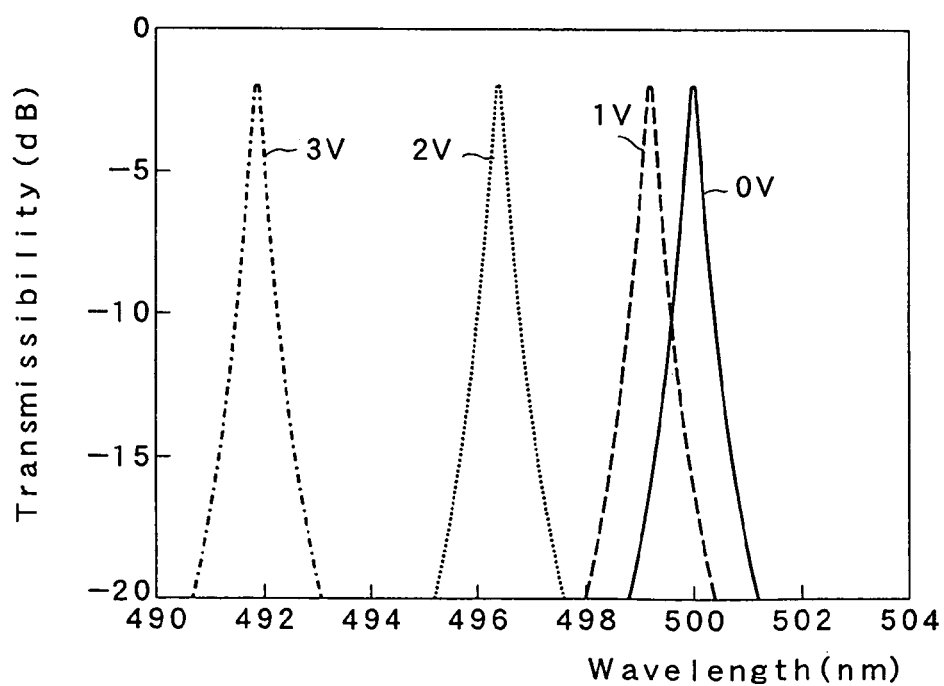
FIG. 11 is a performance mapping that shows a tunable characteristic of the tunable bandpass filter chip of the third embodiment.

FIG. 11 shows a tunable characteristic of the bandpass filter in accordance with the third embodiment. In this figure, the axis of ordinate indicates the transmissibility and the axis of abscissa indicates the wavelength. When the applied voltage is changed from 0 V to 3 V by using the driving power supply 441 shown in FIG. 10, the peak of the transmission spectrum of the bandpass filter is allowed to shift accordingly, as shown in the figure. The insertion loss in the transmitted wavelength is not more than 2 dB, which shows a superior characteristic in the loss. In the case of the applied voltage of 3 V, the amount of wavelength shift was −8 nm as compared to the case of the applied voltage of 0 V, which indicates the fact that the amount of change Δn in the refractive index was −0.16.

By using the above-mentioned equation (2) based upon these figures, the secondary electrooptic coefficient $R_{ij}$ is represented by the following expression (17):

$$R_{13}=R_{23}=2.0\times10^{-16}\,m^2/V^2 \qquad (17).$$

This corresponds to substantially ⅕ of the coefficient which is reported with respect to the single crystal substrate. Since the single crystal state is not perfect, there is a reduction in the electrooptic coefficient $R_{ij}$. However, since the PLZT thin film is very thin, a driving operation is available at a very low driving voltage of 3 V. The response speed of the bandpass filter 401 of the present embodiment is given by the resistance value R of the ITO conductive film and the electrostatic capacitance $C_s$ of the PLZT paraelectric material forming the spacer layer 413. The response speed of the present embodiment, obtained from the above-mentioned expressions (12) and (13), is 2 µs. Therefore, it is not necessary to use an expensive high-voltage amplifier capable of high-speed response. Therefore, the tunable bandpass filter chip 401A is directly driven by using a high-speed IC chip in the 3.3 V standard derived from a personal computer or an electronic apparatus, thereby making it possible to provide an inexpensive, small-size tunable bandpass filter. Thus, it is possible to realize an inexpensive tunable bandpass filter that has high reliability, and is operated within a tunable range of about 8 nm without using any mechanical driving parts.

Here, in the third embodiment, a film-forming process is carried out by using a BK7 glass substrate 402 having 10 mm in each side, and nine tunable bandpass filter chips 401A are cut out. However, the size of the substrate is not intended to be limited to this size. For example, a batch film-forming process may be carried out on a large substrate having a size of not less than φ50 mm, and several hundreds of tunable bandpass filter chips may be manufactured at one time.

Fourth Embodiment

Figure 12:
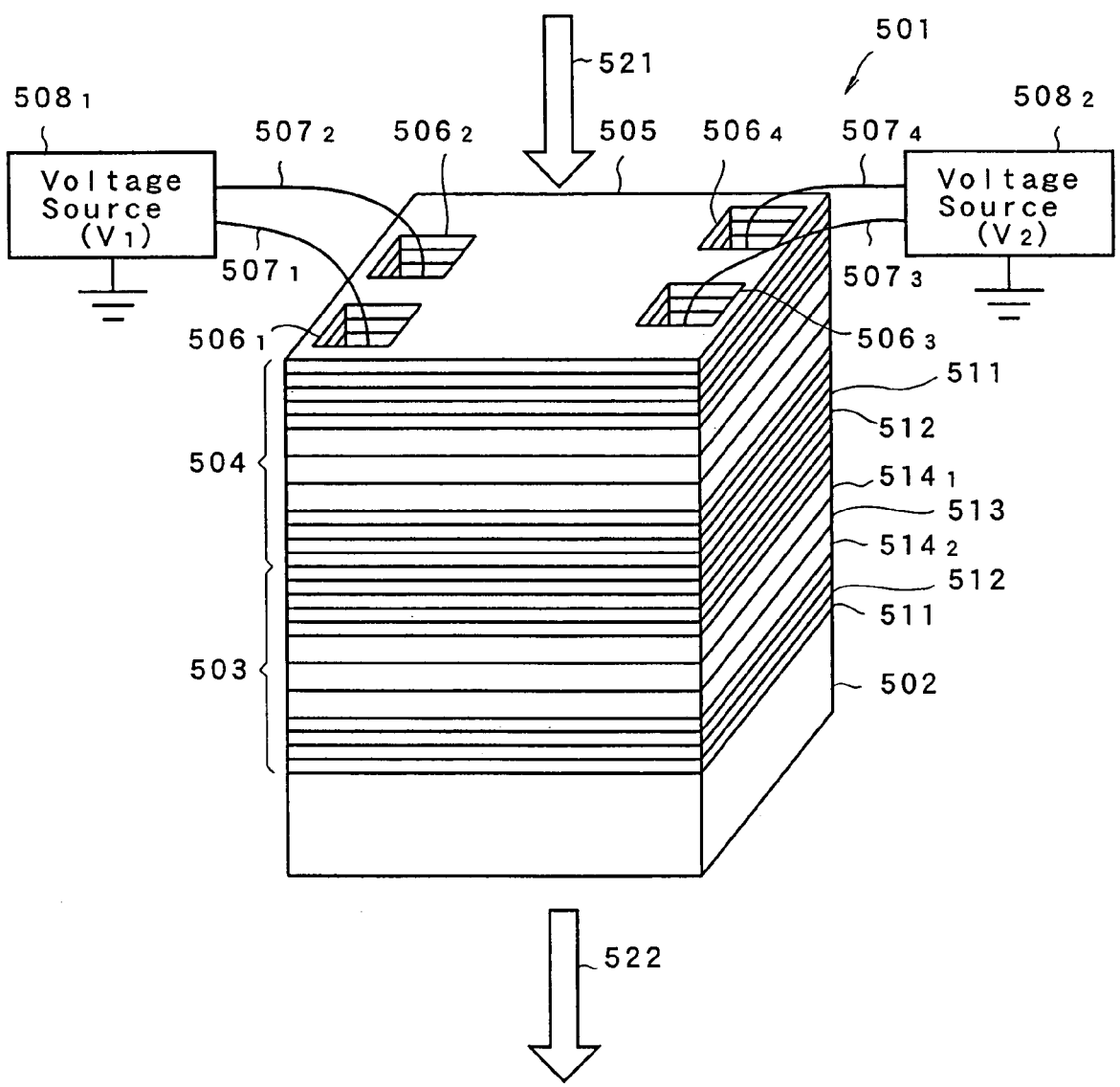
FIG. 12 is a perspective view that shows an appearance of a double cavity-type tunable bandpass filter in accordance with a fourth embodiment of the present invention.

FIG. 12 shows an appearance of a double-cavity type tunable bandpass filter in accordance with the fourth embodiment of the present invention. This double-cavity type tunable bandpass filter 501 has a structure in that a first cavity 503 is formed on a BK7 glass substrate 502 and a second cavity 504 is further formed thereon. A coupling layer 505 is placed as the uppermost layer of the second cavity 504. First to fourth holes $506_1$ to $506_4$, each having a depth reaching an electrode (not shown) on the lower layer, are formed in the upper surface of the coupling layer 505. One end of each of wires $507_1$ and $507_2$ for a first cavity is inserted to each of the first and second holes $506_1$ and $506_2$, and bonded to an electrode (not shown). The other end of each of the wires $507_1$ and $507_2$ for the first cavity is connected to a first voltage source $508_1$ for the first cavity 503. Moreover, one end of each of wires $507_3$ and $507_4$ for a second cavity is inserted to each of the third and fourth holes $506_3$ and $506_4$, and bonded to an electrode (not shown). The other end of each of wires $507_3$ and $507_4$ for the second cavity is connected to a second voltage source $508_2$ for the second cavity 504. In the bandpass filter 501 of the present embodiment, the first and second cavities 503 and 504 have the same structure except that the structure of the coupling layer 505 is slightly different from each other. Therefore, the structure of the first cavity 503 is mainly explained, and the explanation of the second cavity 504 is omitted on demand.

As schematically shown in this figure, the first cavity 503 has the following structure: a high-refractive index dielectric thin film H, that is, a dielectric thin film 511 made of a $Ta_2O_5$ film (refractive index $n_H$=2.16), and a low-refractive index dielectric thin film L, that is, a dielectric thin film 512 made of a $SiO_2$ film (refractive index $n_L$=1.46), are prepared, and on a BK7 glass substrate 502, a plurality of sets of these films are placed alternately, and a spacer layer 513 is further formed thereon. Transparent conductive films $514_1$ and $514_2$ are formed on both of the surfaces of the spacer layer 513. On the upper side of the transparent conductive film $514_2$ located on the upper side of the spacer layer 513, a plurality of sets of the $SiO_2$ dielectric thin films 512 and the $Ta_2O_3$ dielectric thin films 511 are placed in a manner so as to be symmetrical to the structure on the lower side, centered on the spacer layer 513.

In this double-cavity type tunable bandpass filter 501, incident light rays 521 are made incident on the second cavity 504 on the coupling layer 505 side, and the first and second voltage sources $508_1$ and $508_2$ are properly driven so that a light ray having an optional wavelength is released as a transmitted light ray 522.

Figure 13:
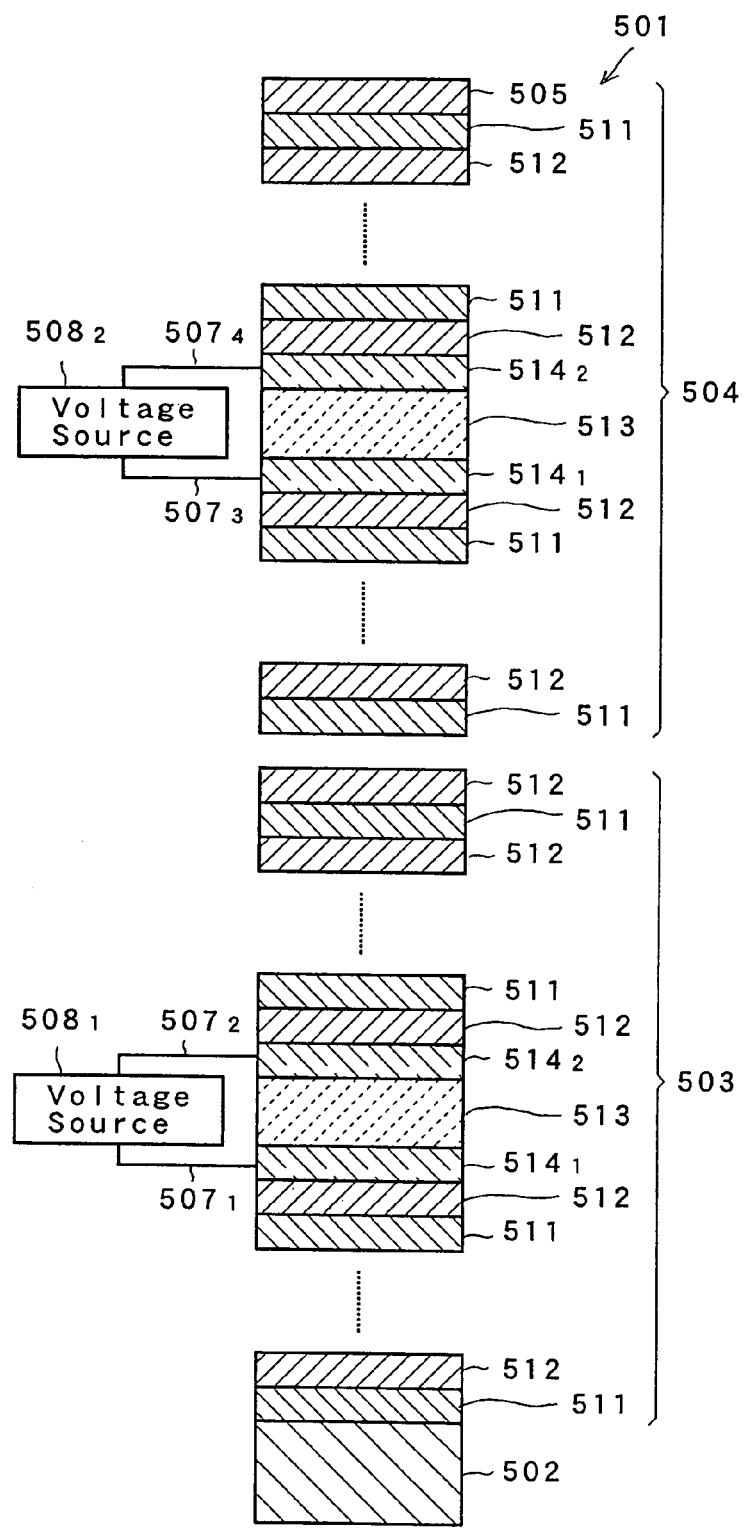
FIG. 13 is a cross-sectional view that shows the structure of the double cavity-type tunable bandpass filter shown in FIG. 12.

FIG. 13 shows a structure of the bandpass filter shown in FIG. 12. As described earlier, the first cavity 503 uses the dielectric thin film 511 made of $Ta_2O_5$ and the dielectric thin film 512 made of $SiO_2$. A plurality of sets of these films are laminated on both of the sides of the transparent conductive films $514_1$ and $514_2$ placed on both of the surfaces of the spacer layer 513. Here, an $Sr_XBa_{1-X}TiO_3$ (where X=0.9) (hereinafter, referred to as SBT) film having the secondary electrooptic effect is used as the spacer layer 513. The refractive index $n_M$ is 2.3. Moreover, a $Cd_2SnO_4$ (hereinafter, referred to as CTO) film is used as each of the transparent conductive films $514_1$ and $514_2$. The refractive index $n_C$ is 1.9. The CTO film serves as a transparent conductive film in the vicinity of a wavelength of 1550 nm, and has resistivity of $2\times10^{-3}$ $\Omega$cm. The external medium is air having a refractive index of 1.0. One end of each of the wires $507_1$ and $507_2$ for the first cavity of the first driving power source $508_1$ is connected to each of the transparent thin films $514_1$ and $514_2$ in the first cavity 503. A voltage $V_1$ of the first driving power source $508_1$ is applied to the transparent conductive films $514_1$ and $514_2$. The structure of the second cavity 504 is the same as that of the first cavity 503. The driving power source $508_2$ applies a voltage $V_2$ to the transparent conductive films $514_1$ and $514_2$.

The film structure B of the double-cavity type tunable bandpass filter 501 of the fourth embodiment is represented by the following expression structure (18):

$$B=[(HL)^7 \ 5C6 \ M5C \ (LH)^7 L][(HL)^7 \ 5C6M \ 5C \ (LH)_7 L] \quad (18)$$

The manufacturing method for the tunable bandpass filter 501 of the fourth embodiment is the same as that of the third embodiment. This method is briefly explained by the support of FIG. 9 used in the third embodiment on demand. Here, the numerical numbers of the respective parts are properly replaced by those numerical numbers shown in FIG. 12 or 13. First, a BK7 glass substrate 502 of $10\times10\times t_2$ mm$^3$ having a clean surface as shown in the first process in FIG. 9 is prepared. Next, as shown in the second process in FIG. 9, a film-forming temperature is set at 700° C. in a vacuum chamber that has been sufficiently vacuumed. Then by using a magnetron sputtering process, seven sets of $Ta_2O_5$ films 511 serving as a high-refractive index dielectric thin film H and $SiO_2$ films 512 serving as a low-refractive index dielectric thin film L are alternately laminated on the BK7 glass substrate 502. Thus, a first mirror stack layer $(HL)^7$ is formed. The physical film thickness of the ¼-wavelength of the high-refractive index dielectric thin film H is 179 nm and that of the low-refractive index dielectric thin film L is 265 nm.

As shown in FIG. 9, in the third process, a transparent conductive film $514_1$ (indicated by "5C" in expression structure (18)) made of a CTO film, which forms a lower-surface conductive film, is vapor-deposited on the first mirror stack layer with a thickness of 1020 nm. Since the CTO film is an intrinsic semiconductor in which conductivity is generated by the oxygen deficit, the oxygen gas flow rate is properly adjusted so that the film is formed with the resistivity being set at $2\times10^{-3}$ $\Omega$cm. Thus, the film is allowed to function as a superior transparent conductive film having an attenuation coefficient of not more than $10^{-4}$. Successively, a SBT film (corresponding to "6M" in expression structure (18)) is laminated with a thickness of 1011 nm as a spacer layer 513. Then, in the same manner, a transparent conductive film $514_2$ (corresponding to "5C" in expression structure (18)) made of a CTO film, which forms an upper-surface conductive film, is vapor-deposited with a thickness of 1020 nm. Next, a second mirror stack layer $(LH)^7$ is film-formed. Lastly, a coupling layer L is vapor deposited with a physical film thickness of the ¼ wavelength of 265 nm, in the same manner. The above-mentioned processes are repeated in the same manner in the second cavity 504 so that a double cavity-type bandpass filter 501 is formed.

The spacer layer thus formed was evaluated by using the θ-2θX ray diffraction pattern. It was found that the resulting film was a polycrystal thin film, since a plurality of surface indexes intermingle with one another and the diffraction strength corresponding to the crystal azimuth is set to about 10% of the entire diffraction strength, although it is in a single phase state. Successively, the sequence proceeds to a process for forming electrodes in the same manner as the third embodiment.

As shown in FIG. 12, the bandpass filter 501 of the present embodiment has a double cavity structure. Then, a cutting process is carried out so as to obtain a bandpass filter chip as shown in FIG. 9G in the second embodiment. After the cutting process, in a coupling layer 505 that forms the uppermost layer of a tunable bandpass filter chip, total four holes (first to fourth holes $506_1$ to $506_4$) each having a depth reaching an electrode (not shown) on the lower layer are formed as shown in FIG. 12 through a dry etching process in the fourth process shown in FIG. 9D. These four holes $506_1$ to $506_4$ are allowed to reach transparent conductive films $514_1$, $514_2$ and $514_1$, $514_2$ on the upper surface and the lower surface that contact the spacer layer 513 of the first cavity and the second cavity. The double cavity-type tunable bandpass filter 501 is connected to external first and second voltage sources $508_1$ and $508_2$ so that independent voltages $V_1$ and $V_2$ are respectively applied to the first and second cavities 503 and 504.

In the tunable bandpass filter 501 of the present embodiment, incident light rays 521, composed of randomly polarized light rays, are externally made incident on the second cavity 504 on the coupling layer 505 side in a direction perpendicular to its face. At this time, the same voltages V are applied in the thickness direction of the tunable bandpass filter 501 as the applied voltages $V_1$ and $V_2$.

FIG. 14 shows a tunable characteristic of the tunable bandpass filter of the fourth embodiment. In this figure, the axis of the ordinate indicates the transmissibility and the axis of the abscissa indicates the wavelength. As shown in this figure, when the applied voltage V changes, the peak of the transmission spectrum of the bandpass filter is allowed to shift accordingly. Moreover, the insertion loss in the transmitted wavelength is not more than 1 dB, which shows a superior characteristic in the loss.

More specifically, in the case of the applied voltage of 4 V, supposing that the shift of wavelength toward the long-wavelength side is defined as plus based upon 0 V of the applied voltage, the amount of wavelength shift was −17 nm. This indicates that the amount of change Δn in the refractive index is −0.10. Based upon this characteristic, by using the above-mentioned equation (2), $R_{ij}$ is represented by the following expression (19):

$$R_{13} = R_{23} = 8 \times 10^{-16} \, m^2/V^2 \quad (19).$$

This corresponds to substantially ¼ of the coefficient which is reported with respect to the single crystal substrate. Since the single crystal state is not perfect, there is a reduction in the electrooptic coefficient. However, since the SBT thin film constituting the spacer layer 513 is very thin, a driving operation is available at a very low driving voltage of 4 V.

The response speed of a sample of the tunable bandpass filter 501 of the present embodiment is limited by the RC time constant. The time constant is defined by the resistance value R of the CTO conductive film and the electrostatic capacitance $C_S$ of the SBT paraelectric material forming the spacer layer. The response speed of the present embodiment, obtained from the above-mentioned expressions (12) and (13), was 3 μs. Therefore, it is not necessary to use an expensive high-voltage amplifier capable of high-speed response. Moreover, the double cavity-type tunable bandpass filter 501 is directly driven by using a high-speed IC chip in the 5 V standard derived from a personal computer or an electronic apparatus, thereby making it possible to provide an inexpensive, small-size tunable bandpass filter.

As described above, the fourth embodiment makes it possible to realize an inexpensive tunable bandpass filter 501 that has high reliability with a sharp filter characteristic, and is operated within a tunable range of about 17 nm without using any mechanical driving parts.

Here, the size of the substrate to be used in the present embodiment is not particularly limited. For example, a batch film-forming process may be carried out on a large substrate having a size of not less than φ50 mm, and several hundreds of tunable bandpass filter chips may be manufactured. Moreover, in an attempt to achieve a higher response speed, it is necessary to reduce the electrostatic capacitance. For this purpose, it is effective to further miniaturize the area of the tunable bandpass filter chip from 3×3 mm². For example, by miniaturizing the chip area to 0.5×0.5 mm², it becomes possible to reduce the electrostatic capacitance to ¹⁄₃₆, and also to achieve a higher response speed of 83 ns.

Fifth Embodiment

FIG. 15 shows an appearance of a double-cavity type tunable bandpass filter in accordance with a fifth embodiment of the present invention. The fifth embodiment relates to a double cavity-type tunable bandpass filter 501A. The basic structure thereof is the same as the double cavity-type tunable bandpass filter 501 of the fourth embodiment shown in FIG. 12. Therefore, the same parts in the fifth embodiment are indicated by adding "A" to the end of each of reference numerals shown in FIG. 12, and referring to FIG. 15, the fifth embodiment is explained.

The double cavity-type tunable bandpass filter 501A of the fifth embodiment also has a structure in that, in the same manner as the fourth embodiment, a first cavity 503A is formed on a BK7 glass substrate 502A and a second cavity 504A is further formed thereon. A coupling layer 505A is placed as the uppermost layer of the second cavity 504A. First to fourth holes $506A_1$ to $506A_4$, each having a depth reaching an electrode (not shown) on the lower layer, are formed in the upper surface of the coupling layer 505A. One end of each of wires $507A_1$ and $507A_2$ for the first cavity is inserted to each of the first and second holes $506A_1$ and $506A_2$, and bonded to an electrode (not shown). The other end of each of the wires $507A_1$ and $507A_2$ for the first cavity is connected to a first driving power source $508A_1$ for the first cavity 503A. Moreover, one end of each of wires $507A_3$ and $507A_4$ for a second cavity is inserted to each of the third and fourth holes $506A_3$ and $506A_4$, and bonded to an electrode (not shown). The other end of each of the wires $507A_3$ and $507A_4$ for the second cavity is connected to a second driving power source $508A_2$ for the second cavity 504A.

In the tunable bandpass filter 501A of the fifth embodiment, the first and second cavities 503A and 504A have the same structure except that the structure of the coupling layer 505A is slightly different from each other. Therefore, the structure of the first cavity 503A is mainly explained, and the explanation of the second cavity 504A is omitted on demand. The design wavelength $\lambda_0$ of a double cavity-type tunable bandpass filter 501A in accordance with a fifth embodiment is 1550 nm.

In the same manner as the fourth embodiment, the fifth embodiment has the following structure: a high-refractive index dielectric thin film H, that is, a dielectric thin film 511A made of a $Ta_2O_5$ film (refractive index $n_H$=2.16), and a low-refractive index dielectric thin film L, that is, a dielectric thin film 512A made of a $SiO_2$ film (refractive index $n_L$=1.46), are prepared, and a plurality of sets of these films are placed alternately, on a BK7 glass substrate 502A and a spacer layer 513A is further formed thereon. Transparent conductive films $514A_1$ and $514A_2$ are formed on both of the surfaces of the spacer layer 513A. $ZnSnO_3$ (hereinafter, referred to as ZTO) films are used as the transparent conductive films $514A_1$ and $514A_2$. The refractive index $n_C$ thereof is 2.0. The ZTO film serves as a transparent conductive film in the vicinity of a wavelength of 1550 nm, and has resistivity of $2 \times 10^{-2}$ Ωcm.

An SBT thin film having the secondary electrooptic effect is used as the spacer layer 513A. The external medium is air having a refractive index of 1.0. The film structure B of the tunable bandpass filter 501A of the fifth embodiment is represented by the same expression structure (18) described earlier.

Moreover, the manufacturing method for the bandpass filter 501A of the fifth embodiment is also the same as that of the fourth embodiment. This method is briefly explained by the support of FIG. 9 used in the second embodiment on demand. Here, the numerical numbers of the respective parts are properly replaced by those numerical numbers shown in FIG. 15. First, a BK7 glass substrate 502A of 10×10×t₂ mm³ having a clean surface as shown in the first process in FIG. 9A is prepared. Next, as shown in the second process in FIG. 9B, a film-forming temperature is set at 700° C. in a vacuum chamber that has been sufficiently vacuumed, and by using a magnetron sputtering process, seven sets of $Ta_2O_5$ films 511A serving as a high-refractive index dielectric thin film H and $SiO_2$ films 512A serving as a low-refractive index dielectric thin film L are alternately laminated on the BK7 glass substrate 502A. Thus, a first mirror stack layer $(HL)^7$ is formed. The physical film thickness of the ¼-wavelength of the high-refractive index dielectric thin film H is 179 nm and that of the low-refractive index dielectric thin film L is 265 nm.

As shown in FIG. 9C, in the third process, a transparent conductive film $514A_1$ (indicated by "5C" in expression structure (18)) made of a ZTO film, which forms a lower-surface conductive film, is vapor-deposited on the first mirror stack layer with a thickness of 1020 nm. Here, in the case of a film-forming temperature of less than 600° C. or 800° C. or more, since compositions other than $ZnSnO_3$, such as ZnO and $Zn_2SnO_4$, are formed, it is necessary to properly control the temperature. Since the ZTO film is an intrinsic semiconductor in which conductivity is generated by the oxygen deficit, the oxygen gas flow rate Is properly adjusted so that the film is formed with the resistivity being set at $2\times10^{-3}$ Ωcm. Thus, the film is allowed to function as a superior transparent conductive film having an attenuation coefficient of not more than $3\times10^{-4}$. Successively, a SBT film (corresponding to "6M" in expression structure (18)) is laminated with a thickness of 1011 nm as a spacer layer 513A. Then, in the same manner, a transparent conductive film $514A_2$ (corresponding to "5C" in expression structure (18)) made of a ZTO film, which forms an upper-surface film, is vapor-deposited with a thickness of 1020 nm. Next, a second mirror stack layer $(LH)^7$ is film-formed. Lastly, a coupling layer L is vapor deposited with a physical film thickness of the ¼-wavelength of 265 nm, in the same manner. The above-mentioned processes are repeated in the same manner in the second cavity 504A so that a double cavity-type bandpass filter 501A is formed.

When the spacer layer was evaluated by using the θ-2θX ray diffraction pattern, a single phase with a single surface index (002) was confirmed so that the resulting film was confirmed to be an epitaxial thin film.

Successively, the sequence proceeds to a process for forming electrodes. Since the bandpass filter 501A of the fifth embodiment has a double-cavity structure, total four electrodes are formed on one tunable bandpass filter chip. The four electrodes are respectively formed on the surfaces of the upper and lower conductive thin films $514A_1$ and $514A_2$ of the first cavity 503A and the second cavity 504A that contact the spacer layer 513A.

FIG. 16 shows a tunable characteristic of the tunable bandpass filter of the fifth embodiment. In this figure, the axis of the ordinate indicates the transmissibility and the axis of the abscissa indicates the wavelength. This figure shows a case where randomly polarized light rays are externally made incident on the bandpass filter 501A perpendicularly, with a DC voltage being applied in the thickness direction. This figure shows that the peak of the transmission spectrum of the bandpass filter is shifted in accordance with the applied voltage V. The insertion loss in the transmission wavelength is about 6 dB. The reason that the insertion loss is great is because the loss of the ZTO film used as the conductive thin film is great.

In the case of the applied voltage of 3 V, the amount of wavelength shift was −25 nm. This indicates that the difference in the refractive index has been changed by Δn=−0.14. Based upon this characteristic, by using the above-mentioned equation (2), $R_{ij}$ is represented by the following expression (20):

$$R_{13}=R_{23}=2\times10^{-16}\text{ m}^2/\text{V}^2 \qquad (20).$$

This corresponds to substantially ½ of the coefficient which is reported with respect to the single crystal substrate. Since the single crystal state is not perfect, there is a reduction in the electrooptic coefficient. However, it is possible to obtain an electrooptic coefficient that is 2.5 times greater than that of the polycrystal film shown in the fourth embodiment. Moreover, since the SBT thin film is very thin, a driving operation is available at a very low driving voltage of 3 V. The response speed of a sample of the tunable bandpass filter 501A of the present embodiment is limited by the RC time constant. The time constant is determined by the resistance value R of the ZTO conductive film and the electrostatic capacitance C of the SBT paraelectric material forming the spacer layer. The response speed of the present embodiment, obtained from the above-mentioned expressions (12) and (13), is 30 μs. Therefore, it is not necessary to use an expensive high-voltage amplifier capable of high-speed response. Consequently, the double cavity-type tunable bandpass filter 501A is directly driven by using a high-speed IC chip in the 3.3 V standard derived from a personal computer or an electronic apparatus, thereby making it possible to provide an inexpensive, small-size tunable bandpass filter.

As described above, the fifth embodiment makes it possible to realize an inexpensive tunable bandpass filter that has high reliability with a sharp filter characteristic, and is operated within a wide tunable range of about 25 nm without using any mechanical driving parts.

Here, in place of SBT used for the spacer layer of the fifth embodiment, $KTa_xNb_{1-x}O_3$ (where 0.5≦X≦1.0), which has the same perovskite-type crystal structure, may be used so that an electrooptic coefficient of $2\times10^{-15}$ m²/V², which is the same level of coefficient, is obtained. Its lattice constant is 3.99 angstroms, which is close to that of ZTO. This material is composed of components that are good for the environment. Moreover, in place of the ZTO film, $AgSbO_3$, which has the same perovskite-type crystal structure, may be used to obtain the same characteristics. In comparison with ZTO, $AgSbO_3$ exerts superior transparency in an infrared range. Therefore, this is suitably applied to a case where a tunable bandpass filter having a reduced loss is prepared.

The size of the substrate to be used in the present embodiment is not particularly limited. For example, a batch film-forming process may be carried out on a large substrate having a size of not less than φ50 mm, and several hundreds of tunable bandpass filter chips may be manufactured.

Sixth Embodiment

The following description will discuss a hitless tunable selector in accordance with the sixth embodiment. FIG. 17 shows the basic structure of this hitless tunable selector 501B. The tunable selector 501B is the same as the double cavity-type tunable bandpass filter 501 of the fourth embodiment shown in FIG. 12. The same parts constituting the hitless tunable selector 501B in the sixth embodiment are indicated by adding "B" to the end of each of reference numerals shown in FIG. 12. The sixth embodiment is explained referring to FIG. 17. In the hitless tunable selector 501B, voltages $V_1$ and $V_2$ to be applied to the first cavity 503B and the second cavity 504B are appropriately set so that wavelengths can be switched from $\lambda_i$ to $\lambda_j$ without giving any adverse effects to the wavelength signal in the course of change.

Figure 18A:
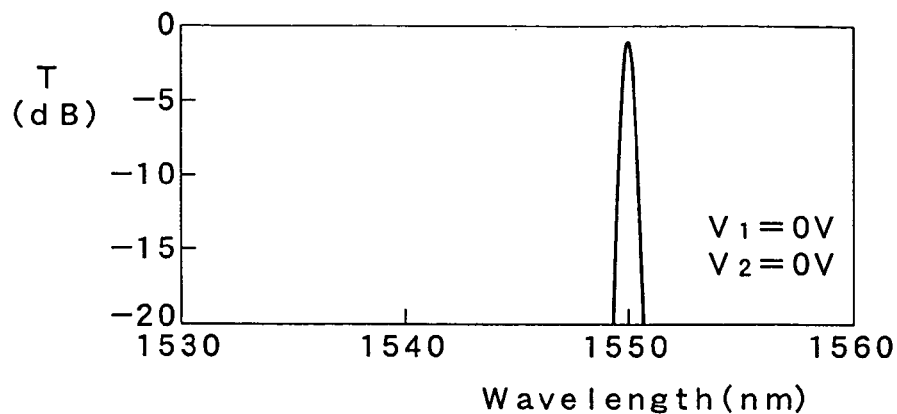
FIGS. 18A to 18C are performance mappings each of which shows a tunable characteristic of a hitless tunable selector in accordance with the sixth embodiment of the present invention.
Figure 18B:
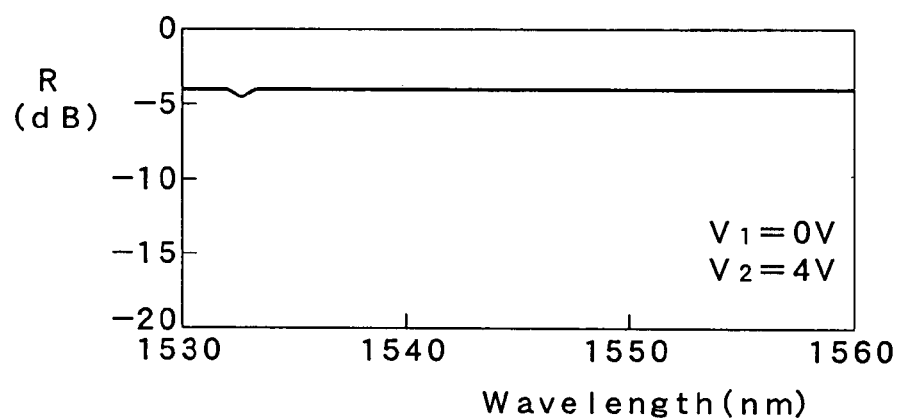
Figure 18C:
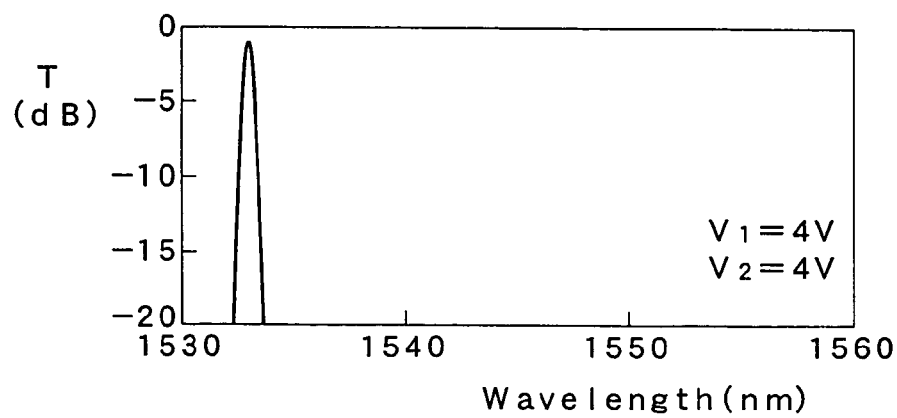

FIGS. 18A to 18C show a tunable characteristic of this hitless tunable selector. As shown in FIG. 18A, in the case where the voltages $V_1$ and $V_2$ to be respectively applied to the first and second cavities 503B and 504B are 0 V, two cavities 503B and 504B have resonance wavelengths at the same wavelength, that is, 1550 nm.

Next, in the case where the voltage $V_1$ is 0V and $V_2$ is 4 V, the resonance wavelengths of the first and second 503B and 504B are respectively 1550 nm and 1533 nm. At this time, as shown in FIG. 18B, the hitless tunable selector 501B exhibits a substantially high reflective property in the entire tunable range. In this case, the filter works as a mirror, causing no degradation in the signal strength of a specific wavelength channel.

Next, as shown in FIG. 18C, in the case where both of the voltages $V_1$ and $V_2$ are 4 V, the first cavity 503B and the second cavity 504B have resonance wavelengths at the same wavelength, that is, 1533 nm, thereby providing a bandpass filter characteristic that is less susceptible to transmission loss.

In conventional tunable bandpass filters, upon shifting the wavelength from one wavelength $\lambda_i$ to another wavelength $\lambda_j$, the wavelength is changed by crossing a wavelength range located in between. Therefore, when such a conventional tunable bandpass filter is used for carrying out wavelength multiplex optical communication, it causes a fault to the multi-channel. In contrast, the hitless tunable selector 501B of the present embodiment, upon shifting the wavelength from one wavelength $\lambda_i$ to another wavelength $\lambda_j$, the respective resonance frequencies of the multiplex cavities are once offset, and the voltage is then controlled so that the same resonance wavelength, that is, the wavelength $\lambda_j$, is obtained. Thus, it is possible to achieve a tunable selector having a hitless function. Further, the hitless tunable selector 501B has the same structure as the fourth embodiment. For this reason, the present embodiment makes it possible to achieve a small-size hitless tunable selector that has a high response property of 3 μs, as shown in the tunable bandpass filter 501 of the fourth embodiment, and also has high reliability, without requiring any mechanical movements.

Here, the driving power sources $508_1$ and $508_2$ constitute characteristic controlling units that change the transmission peak wavelength of the bandpass filter. In order to realize hitless operations, the characteristic controlling units carry out controls so that switching operations are made among a state where all the voltages are set to a first voltage with the selected wavelength being set as the first wavelength, a state where some voltages are set to a second voltage, and a state in which all the voltage are set to a second voltage with the selected wavelength being set as the second wavelength.

Here, the hitless tunable selector 501B of the present embodiment can be realized by using a filter having a multiplex resonator structure having double-cavities or more. By offsetting at least two or more resonance wavelengths of the respective cavities in an m-multiplex resonator, switching can be made to a high reflection mirror state.

Seventh Embodiment

Figure 19:
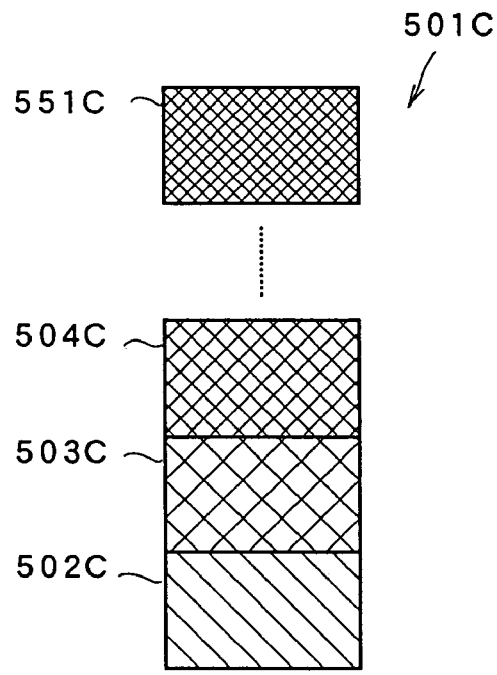
FIG. 19 is a cross-sectional view that shows the outline of a structure of m-multiplex cavity-type tunable bandpass filter in accordance with a seventh embodiment of the present invention.
Figure 20:
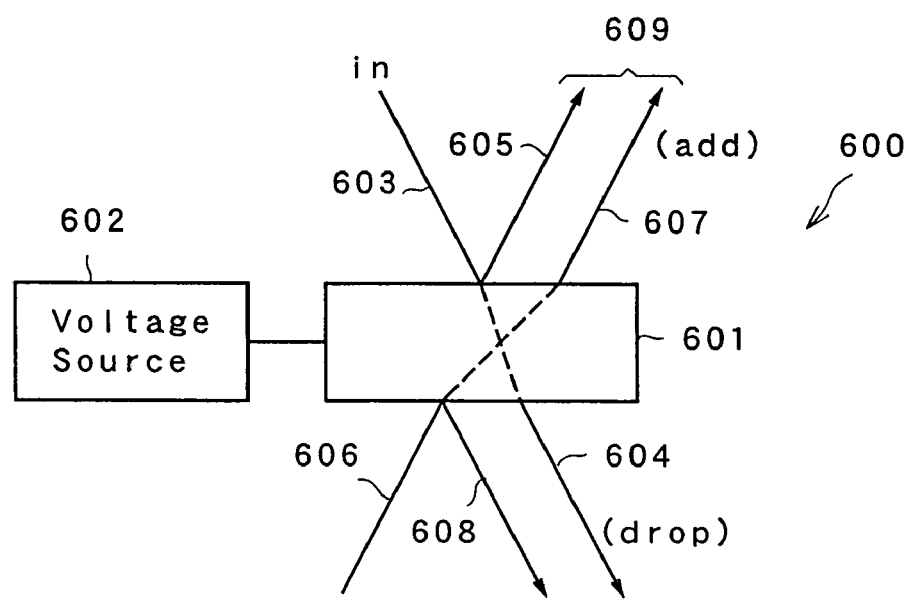
FIG. 20 is a diagram that shows the principle of an add-drop module in accordance with a eighth embodiment of the present invention used.

FIG. 19 shows a schematic structure of m-multiplex cavity-type tunable bandpass filter having m-multiplexed cavities in accordance with the seventh embodiment. In the m-multiplex cavity-type tunable bandpass filter 501C, a first cavity 503C is formed on a BK7 glass substrate 502C, a second cavity 504C is formed thereon, and cavities are successively formed thereon so that the m-numbered cavity 551C corresponds to the upper-most layer. Here, the numeric value m is an integer of not less than 3.

As explained in the sixth embodiment, the m-multiplex-cavity-type tunable bandpass filter 501C is applicable to the hitless tunable selector 501B and the like.

Eighth Embodiment

FIG. 18 shows an eighth embodiment of an optical add-drop module. The optical add-drop module has high-speed response by using any of optical filters described in the abovementioned embodiments.

A tunable optical filter 601 which forms an optical add-drop module 600 is arranged in a predetermined node. A voltage source 602, which serves as a wavelength selection unit, desirably changes a wavelength of an optical signal to be transmitted or reflected by changing its voltage. Signal light 603, which has been wavelength-multiplexed and transferred from the preceding node, is made incident on the tunable optical filter 601 and only the signal light 604 having a wavelength $\lambda_x$ that corresponds to the applied 20 voltage from the voltage source 602 is allowed to pass through the tunable optical filter 601, and dropped (extracted) as a signal of this node. Signal light 605 except that having this wavelength $\lambda_x$ is reflected.

Here, a signal light ray 606 of at least one channel having been prepared is irradiated at this node from the opposite surface to the tunable optical filter 601. Then, only the signal light 607 having the same wavelength as the dropped wavelength $\lambda_x$ of the signal light 604 is allowed to pass through the tunable optical filter 601. Signal light 608 with the wavelength of the remainder is reflected as the signal that is not dealt as a subject for the insertion. Consequently, from the upper surface in the figure, signal light 609 of all the channels, in which the dropped signal light 604 is replaced by the signal light 607 that is prepared at this node, is obtained as reflected light or transmitted light. Then, this signal light is appropriately amplified and sent to the next node. By changing the output voltage of the voltage source 602, it is possible to easily change the wavelength (channel) to be added or dropped promptly. Thus, the optical add-drop module 600 is allowed to have various structures by utilizing the tunable optical filter 601.

Not limited to the single cavity type, the tunable optical filter in this embodiment may be used as an m-multiplexed cavity-type tunable optical filter, and in this case, it is possible to achieve an optical add-drop module having higher wavelength selectivity.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The text of Japanese priority application No. 2003-165377 filed on Jun. 10, 2003 is hereby incorporated by reference.

What is claimed is:

1. An optical element comprising at least one cavity which includes:
   a first composite stack layer having a first mirror stack layer constituted by alternately stacking a plurality of first and second dielectric thin films having respectively different refractive indexes and a first conductive film formed on said first mirror stack layer;
   a second composite stack layer having a second mirror stack layer constituted by alternately stacking a plurality of first and second dielectric thin films having respectively different refractive indexes and a second conductive film formed on said second mirror stack layer; and
   a spacer layer made of a planar paraelectric material with a secondary electrooptic effect and having one of the faces made in contact with said first conductive film and the other face made in contact with said second conductive film; and
   wherein a plurality of said cavities are stacked in a form of a layer.

2. An optical element according to claim 1, wherein each of said cavities includes a characteristic controlling unit which controls spectrum characteristics of light rays made incident on one of said first and second composite stack layers and transmitted through or reflected from the layer, in response to a voltage applied between said first and second conductive films.

3. An optical element according to claim 1, wherein said spacer layer is made of an oxide paraelectric single crystal with both faces optically polished having a secondary electrooptic effect, and has a thickness set in a range from 10 μm to 10 mm.

4. An optical element according to claim 3, wherein said oxide paraelectric material is $Pb_{1-x}La_x(Zr_{1-y}Ti_y)_{1-x/4}O_3$, $(0 \leq x < 1.0, 0 \leq y \leq 1.0)$.

5. An optical element according to claim 3, wherein said oxide paraelectric material is $Sr_xBa_{1-x}TiO_3$, $(0.3 \leq X \leq 1.0)$.

6. An optical element according to claim 3, wherein said oxide paraelectric material is $KTa_xNb_{1-x}O_3$, $(0.5 \leq X \leq 1.0)$.

7. An optical element according to claim 1, wherein said spacer layer is an oxide paraelectric thin film, which is one of a polycrystal, oriented and epitaxial, film having a secondary electrooptic effect and vapor-deposited on an upper face of one of the first and second composite stack layers, and having a thickness in a range from 10 nm to 50 μm.

8. An optical element according to claim 1, wherein said conductive film is an oxide transparent conductive film made of ZnO.

9. An optical element according to claim 1, wherein said conductive film is an oxide transparent conductive film made of ITO $(Sn:In_2O_3)$.

10. An optical element according to claim 1, wherein said conductive film is an oxide transparent conductive film made of $Cd_2SnO_4$.

11. An optical element according to claim 1, wherein said conductive film is an oxide transparent conductive film made of $ZnSnO_3$.

12. An optical element according to claim 1, wherein said conductive film is an oxide transparent conductive film made of $AgSbO_3$.

13. An optical element according to claim 1, wherein said optical element is a tunable filter.

14. An optical element comprising at least one cavity which includes:
   a first composite stack layer having a first mirror stack layer constituted by alternately stacking a plurality of first and second dielectric thin films having respectively different refractive indexes and a first conductive film formed on said first mirror stack layer;
   a second composite stack layer having a second mirror stack layer constituted by alternately stacking a plurality of first and second dielectric thin films having respectively different refractive indexes and a second conductive film formed on said second mirror stack layer; and
   a spacer layer made of a planar paraelectric material with a secondary electrooptic effect and having one of the faces made in contact with said first conductive film and the other face made in contact with said second conductive film; and
   wherein said first mirror stack layer is formed by alternately stacking a first dielectric thin film made of a high refractive index material having a physical film thickness of a ¼-wavelength of a design wavelength and a second dielectric thin film made of a low refractive index material having a physical film thickness of the ¼-wavelength with a refractive index lower than that of the high refractive index material,
   said second mirror stack layer is formed by alternately stacking the first dielectric thin film made of the high refractive index material having the physical film thickness of the ¼-wavelength and the second dielectric thin film made of the low refractive index material having the physical film thickness of the ¼-wavelength with the refractive index lower than that of the high refractive-index material,
   said spacer layer is placed between said first and second mirror stack layers and is made of a paraelectric thin film having a film thickness of positive even-number times the physical film thickness of the ¼-wavelength and having a secondary electrooptic effect,
   said first conductive film is placed between said first mirror stack layer and said spacer layer and is made of a transparent conductive thin film having a film thickness of positive odd-number times the physical film thickness of the ¼-wavelength, and
   said second conductive film is placed between said second mirror stack layer and said spacer layer and is made of a transparent conductive thin film having a film thickness of positive odd-number times the physical film thickness of the ¼-wavelength.

15. An optical element according to claim 14, wherein a plurality of said cavities are stacked in a form of a layer.

16. An optical element according to claim 14, wherein each of said cavities includes a characteristic controlling unit which controls spectrum characteristics of light rays made incident on one of said first and second composite stack layers and transmitted through or reflected from the layer, in response to a voltage applied between said first and second conductive films.

17. An optical element according to claim 14, wherein said spacer layer is made of an oxide paraelectric single crystal with both faces optically polished having a secondary electrooptic effect, and has a thickness set in a range from 10 μm to 10 mm.

18. An optical element according to claim 14, wherein said paraelectric material is $Pb_{1-x}La_x(Zr_{1-y}Ti_y)_{1-x/4}O_3$, $(0 \leq X \leq 1.0, 0 \leq Y \leq 1.0)$.

19. An optical element according to claim 14, wherein said oxide paraelectric material is $Sr_xBa_{1-x}TiO_3$, $(0.3 \leq X \leq 1.0)$.

20. An optical element according to claim 14, wherein said paraelectric material is $KTa_xNb_{1-x}O_3$, $(0.5 \leq X \leq 1.0)$.

21. An optical element according to claim 14, wherein said spacer layer is an oxide paraelectric thin film, which is one of a polycrystal, oriented and epitaxial, film having a secondary electooptic effect and vapor-deposited on an upper face of one of the first and second composite stack layers, and having a thickness in a range from 10 nm to 50 μm.

22. An optical element according to claim 14, wherein said conductive film is an oxide transparent conductive film made of ZnO.

23. An optical element according to claim 14, wherein said conductive film is an oxide transparent conductive film made of ITO ($Sn:In_2O_3$).

24. An optical element according to claim 14, wherein said conductive film is an oxide transparent conductive film made of $Cd_2SnO_4$.

25. An optical element according to claim 14, wherein said conductive film is an oxide transparent conductive film made of $ZnSnO_3$.

26. An optical element according to claim 14, wherein said conductive film is an oxide transparent conductive film made of $AgSbO_3$.

27. An optical element according to claim 14, wherein said optical element is a tunable filter.

28. An optical add-drop module comprising:
at least one cavity; and
a wavelength selection unit, wherein
said cavity includes:
a first composite stack layer having a first mirror stack layer constituted by alternately stacking a plurality of first and second dielectric thin films having respectively different refractive indexes and a first conductive film formed on the first mirror stack layer;
a second composite stack layer having a second mirror stack layer constituted by alternately stacking a plurality of first and second dielectric thin films having respectively different refractive indexes and a second conductive film formed on the second mirror stack layer; and
a spacer layer which is made of a planar paraelectric material with a secondary electrooptic effect, and has one of the faces made in contact with said first conductive film and the other face made in contact with said second conductive film, and
said wavelength selection unit changes a wavelength of light to be transmitted or reflected, by controlling a voltage to be applied between said first and second conductive films of each of said cavities.

29. An optical add-drop module according to claim 28, wherein
a plurality of cavities are stacked in the form of a layer.

30. An optical add-drop module according to claim 28, wherein
said first mirror stack layer is formed by alternately stacking a first dielectric thin film made of a high refractive index material having a physical film thickness of a ¼-wavelength of a design wavelength and a second dielectric thin film made of a low refractive index material having a physical film thickness of the ¼-wavelength with a refractive index lower than that of the high refractive index material,
said second mirror stack layer is formed by alternately stacking a first dielectric thin film made of the high refractive index material having the physical film thickness of the ¼-wavelength and the second dielectric thin film made of the low refractive index material having the physical film thickness of the ¼-wavelength with the refractive index lower than that of the high refractive-index material,
said spacer layer is placed between said first and second mirror stack layers and is made of a paraelectric thin film having a film thickness of positive even-number times the physical film thickness of the ¼-wavelength and having a secondary electrooptic effect,
said first conductive film is placed between said first mirror stack layer and said spacer layer and is made of a transparent conductive thin film having a film thickness of positive odd-number times the physical film thickness of the ¼-wavelength, and
said second conductive film is placed between said second mirror stack layer and said spacer layer and is made of a transparent conductive thin film having a film thickness of positive odd-number times the physical film thickness of the ¼-wavelength.

31. An optical add-drop module according to claim 30, wherein
a plurality of cavities are stacked in the form of a layer.

* * * * *